(12) United States Patent
Kim

(10) Patent No.: US 7,995,457 B2
(45) Date of Patent: Aug. 9, 2011

(54) METHOD AND SYSTEM FOR SFBC/STBC TRANSMISSION OF ORTHOGONALLY CODED SIGNALS WITH ANGLE FEEDBACK IN A DIVERSITY TRANSMISSION SYSTEM

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 498 days.

(21) Appl. No.: 11/759,203

(22) Filed: Jun. 6, 2007

(65) Prior Publication Data

US 2008/0253337 A1    Oct. 16, 2008

Related U.S. Application Data

(60) Provisional application No. 60/912,126, filed on Apr. 16, 2007.

(51) Int. Cl.
  H04J 11/00    (2006.01)
  H04B 7/216    (2006.01)
  H04B 15/00    (2006.01)
  H04L 1/02     (2006.01)

(52) U.S. Cl. ........ 370/208; 370/335; 375/267; 455/63.1
(58) Field of Classification Search ............. 370/208
  See application file for complete search history.

(56) References Cited

U.S. PATENT DOCUMENTS

| 2006/0039489 A1* | 2/2006 | Ikram et al. ............ 375/260 |
| 2006/0039497 A1* | 2/2006 | Vu et al. ............... 375/267 |
| 2006/0093061 A1* | 5/2006 | Chae et al. ............. 375/267 |
| 2006/0285531 A1* | 12/2006 | Howard et al. ......... 370/343 |
| 2007/0049199 A1* | 3/2007 | Lim et al. ............. 455/63.1 |
| 2008/0069054 A1* | 3/2008 | Ho et al. .............. 370/335 |
| 2008/0108310 A1* | 5/2008 | Tong et al. ............ 455/69 |

OTHER PUBLICATIONS

Lei Shao, Sumit Roy, Rate-One Space-Frequency Block Codes With Maximum Diversity for MIMO-OFDM, IEEE Transactions on Wireless Communications, vol. 4, No. 4, Jul. 2005, pp. 1674-1687.
A. Naguib, N. Seshadri, A.R. Calderbank, Increasing Data Rate Over Wireless Channels, IEEE Signal Processing Magazine, May 2000.
V. Tarokh, H. Jafarkhani, A.R. Calderbank, Space-Time Block Codes from Orthogonal Designs, IEEE Transaction on Information Theory, vol. 45, No. 5, Jul. 1999.
H. Jafarkhani, A Quasi-Orthogonal Space-Time Block Code, IEEE Transactions on Communications, vol. 49, No. 1, Jan. 2001.

* cited by examiner

*Primary Examiner* — Ricky Ngo
*Assistant Examiner* — Paul Masur
(74) *Attorney, Agent, or Firm* — McAndrews, Held & Malloy, Ltd.

(57) ABSTRACT

Aspects of a method and system for SFBC/STBC transmission of orthogonally coded signals with angle feedback in a diversity transmission system are presented. Exemplary aspects of the system may include one or more circuits that enables generation of a plurality of concurrently transmitted signal groups based on a computed matrix such that a product of the plurality of concurrently transmitted signal groups, the computed matrix and/or a transformed version of the computed matrix, may generate at least one set of orthogonal signals based on at least one rotation angle.

35 Claims, 10 Drawing Sheets

METHOD AND SYSTEM FOR SFBC/STBC TRANSMISSION OF ORTHOGONALLY CODED SIGNALS WITH ANGLE FEEDBACK IN A DIVERSITY TRANSMISSION SYSTEM

CROSS-REFERENCE TO RELATED APPLICATIONS/INCORPORATION BY REFERENCE

This application makes reference to, claims priority to, and claims the benefit of U.S. Provisional Application Ser. No. 60/912,126 filed Apr. 16, 2007.

The above stated application is hereby incorporated herein by reference in its entirety.

FIELD OF THE INVENTION

Certain embodiments of the invention relate to data communication. More specifically, certain embodiments of the invention relate to a method and system for SFBC/STBC transmission of orthogonally coded signals with angle feedback in a diversity transmission system.

BACKGROUND OF THE INVENTION

Quasi-orthogonal space time block coding (STBC) is a method utilized in some diversity transmission systems utilized in the field of wireless communication. The appeal of quasi-orthogonal STBC is that it seeks to enable wireless communication systems to utilize advantages of diversity transmission at a transmitting station, while allowing simplified decoding techniques at a receiving station.

Diversity transmission enables a stream of data to be transmitted via a plurality of transmitting antennas. Diversity transmission systems are described by the number of transmitting antennas and the number of data streams. For example, a diversity transmission system, which utilizes four transmitting antennas to transmit data from a single data stream may be referred to as a 4×1 diversity transmission system. The data stream may comprise a sequence of data symbols referred to as data symbols. With quasi-orthogonal STBC, each of the plurality of transmitting antennas may transmit one of the data symbols, or a permutated version of the data symbols, at a given time instant. Each of the data symbols may be referred to as a codeword. A single codeword may be represented s(i,k), where i represents an index to a transmitting antenna, and k represents a time index to the data symbol within the data stream. For example, s(0,0) may represent a first data symbol within a data stream that is transmitted from a first transmitting antenna while s(1,1) may represent a second data symbol within the data stream that is transmitted by the second transmitting antenna, s(2,2) may represent a third data symbol within the data stream that is transmitted by the third transmitting antenna and s(3,3) may represent a fourth data symbol within the data stream that is transmitted by the fourth transmitting antenna. Thus, with STBC, at a given time instant, each of the transmitting antennas may transmit a data symbol that occurs at a distinct time instant within the data stream.

A variation of STBC is space frequency block coding (SFBC). With SFBC, codewords are formed by selecting frequency carriers, or tones, which contain portions of data carried in a data symbol. With SFBC diversity transmission, at a given time instant, each of the transmitting antennas may transmit a codeword, or permutated version of a codeword, which comprises a portion of the data contained within a given data symbol. Collectively, the plurality of transmitting antennas may simultaneously transmit codewords, which may be combined to reconstruct the data symbol. A single SFBC codeword may be represented by s(i,k), where i represents an index to a transmitting antenna, and k represents a group of tones. For example, s(0,0) may represent a codeword that comprises tones 0, 4, 8 and 16 within a data symbol, which is transmitted by a first transmitting antenna, while s(1,1) may represent a codeword that comprises tones 1, 5, 9 and 17 within the data symbol, which is transmitted by a second transmitting antenna, s(2,2) may represent a codeword that comprises tones 2, 6, 10 and 18 within the data symbol, which is transmitted by a third transmitting antenna and s(3,3) may represent a codeword that comprises tones 3, 7, 11 and 19 within the data symbol, which is transmitted by a fourth transmitting antenna. A single transmitted codeword may comprise a plurality of tones represented by the tone group index, k.

In the case of diversity transmission, with either STBC or SFBC, the transmitted signal may be modified as it travels across a communication medium to the receiving station. This signal-modifying property of the communication medium may be referred to as fading. Each of the signals transmitted by each of the plurality of transmitting antennas may experience differing amounts of fading as the signals travel through the communication medium. This variable fading characteristic may be represented by a transfer function matrix, H, which comprises a plurality of transfer function coefficients, $h_{ji}$, that represent the differing fading characteristics experienced by the transmitted signals.

The transmitted signals with either STBC or SFBC may be received at a receiving antenna located at a receiving station. The receiving station may process the received signals to determine estimated values for the codewords carried by the transmitted signals. However, the task of computing estimated values for the codewords may be computationally complex even when quasi-orthogonal STBC or SFBC are utilized to suppress off-diagonal crosstalk.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for SFBC/STBC transmission of orthogonally coded signals with angle feedback in a diversity transmission system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for SFBC/STBC transmission of orthogonally coded signals with angle feedback in a diversity transmission system. Various embodiments of the invention may comprise a method and system by which individual transmitted complex signals, in a multiple antenna transmit diversity system, may be rotated such that the group of signals may form an orthogonal set of transmitted complex signals.

Various embodiments of the invention may also comprise a method and system for transmitting signals in a diversity transmission system based on received feedback information. A transmitting station may receive feedback information, for example from a receiving station, and subsequently generate a plurality of concurrently transmitted signals based on the feedback information. The receiving station may receive the subsequently generated plurality of concurrently transmitted signals.

In an exemplary embodiment of the invention, in a wireless local area network (WLAN), a WLAN Station_A may receive channel feedback information from a WLAN Station_B, which comprises a feedback angle. The feedback angle may subsequently be utilized to achieve rotation of subsequent complex signals transmitted from the Station_A. The channel feedback information may comprise one or two bits. The method of feedback angle determination and subsequent rotation of complex signals transmitted by the Station_A may enable a receiving Station_B to achieve communication performance levels, as measured by bit error rate (BER) or packet error rate (PER) for example, when utilizing simplified minimum mean squared error (MMSE) processing techniques, which may be comparable to those achievable when utilizing more complex maximum likelihood sequence estimation (MLSE) techniques.

Figure 1:
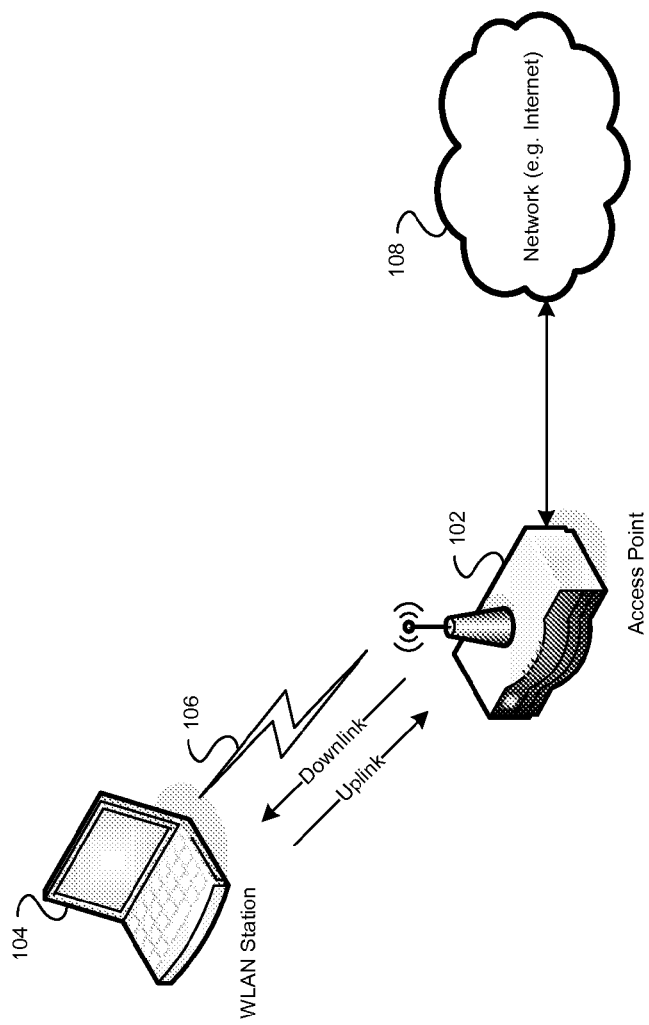
FIG. 1 is an exemplary wireless communication system, which may be utilized in connection with an embodiment of the invention.

FIG. 1 is an exemplary wireless communication system, which may be utilized in connection with an embodiment of the invention. Referring to FIG. 1, there is shown an access point (AP) 102, a wireless local area network (WLAN) station (STA) 104, and a network 108 (for example, the Internet). The AP 102 and the STA 104 may communicate wirelessly via one or more radio frequency (RF) channels 106. The AP may be communicatively coupled to the network 108. The AP 102, STA 104 and network 108 may enable communication based on one or more IEEE 802 standards, for example IEEE 802.11.

The STA 104 may utilize the RF channel 106 to communicate with the AP 102 by transmitting signals via an uplink channel. The transmitted uplink channel signals may comprise one of more frequencies associated with a channel as determined by a relevant standard, such as IEEE 802.11. The STA 104 may utilize the RF channel 106 to receive signals from the AP 102 via a downlink channel. Similarly, the received downlink channel signals may comprise one of more frequencies associated with a channel as determined by a relevant standard, such as IEEE 802.11.

The STA 104 and AP 102 may communicate via time division duplex (TDD) communications and/or via frequency division duplex communications. With TDD communications, the STA 104 may utilize the RF channel 106 to communicate with the AP 102 at a current time instant while the AP 102 may communicate with the STA 104 via the RF channel 106 at a different time instant. With TDD communications, the set of frequencies utilized in the downlink channel may be substantially similar to the set of frequencies utilized in the uplink channel. With FDD communications, the STA 104 may utilize the RF channel 106 to communicate with the AP 102 at the same time instant at which the AP 102 utilizes the RF channel 106 to communicate with the STA 104. With FDD communications, the set of frequencies utilized in the downlink channel may be different from the set of frequencies utilized in the uplink channel.

Figure 2:
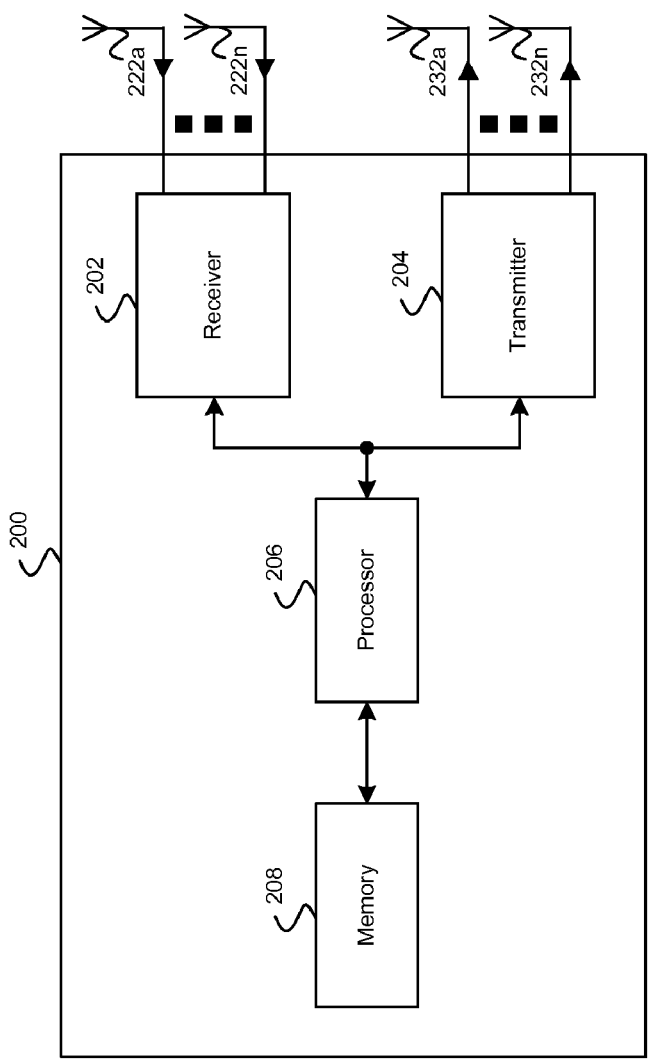
FIG. 2 is an exemplary transceiver, which may be utilized in connection with an embodiment of the invention.

FIG. 2 is an exemplary transceiver, which may be utilized in connection with an embodiment of the invention. Referring to FIG. 2, there is shown a transceiver system 200, a plurality of receiving antennas 222a . . . 222n and a plurality of transmitting antennas 232a . . . 232n. The transceiver system 200 may comprise at least a receiver 202, a transmitter 204, a processor 206, and a memory 208. Although a transceiver is shown in FIG. 2, transmit and receive functions may be separately implemented.

In accordance with an embodiment of the invention, the processor 206 may enable digital receiver and/or transmitter functions in accordance with applicable communications standards. In addition, the processor 206 may enable the computation of rotation angles based on channel feedback information. The computed rotation angles may enable generation of an orthogonal set of transmitted signals, in accordance with various embodiments of the invention. The processor 206 may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

The receiver 202 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 222a . . . 222n. The data may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 206. The RF signals may be transmitted via one or more transmitting antennas 232a . . . 232n.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM). In the context of the present application, the memory 208 may enable storage of code for the computation and storage of rotation angles based on channel feedback information, the computation and storage of channel estimates based on the channel feedback information and/or the storage of channel feedback information, for example.

Figure 3:
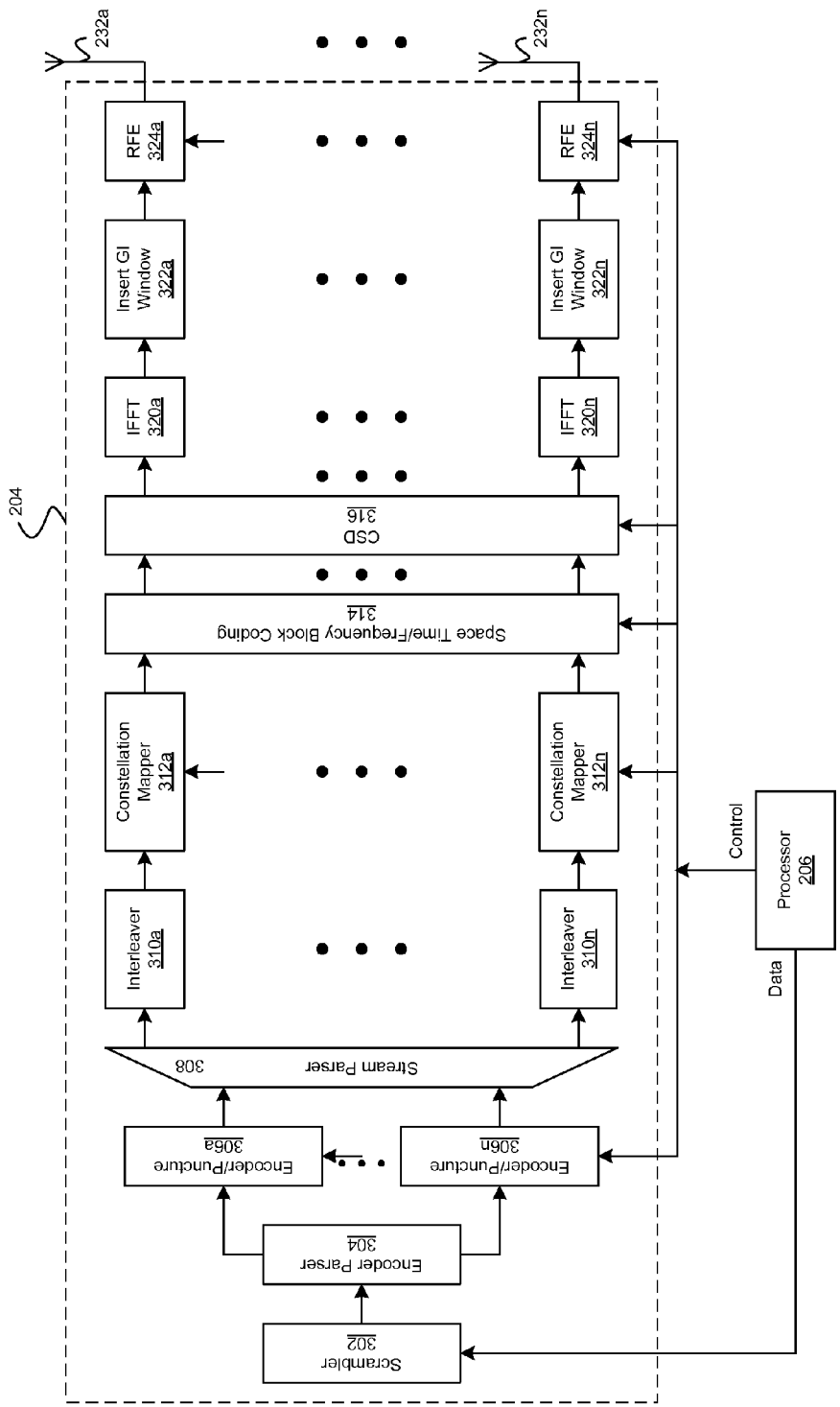
FIG. 3 is an exemplary block diagram of a transmitter, which may be utilized in connection with an embodiment of the invention.

FIG. 3 is an exemplary block diagram of a transmitter, which may be utilized in connection with an embodiment of the invention. Referring to FIG. 3, there is shown a transmitter 204, a processor 206 and a plurality of transmitting antennas 232a, . . . and 232n. The transmitter 204 may comprise a scrambler 302, an encoder parser 304, a plurality of encoder and puncture (encoder/puncture) blocks 306a, . . . , and 306n, a stream parser 308, a plurality of interleaver blocks 310a, . . . , and 310n, a plurality of constellation mapper blocks 312a, . . . , and 312n, a space time/frequency block coding (STBC/SFBC) block 314, a cyclical shift diversity (CSD) block 316, a plurality of inverse fast Fourier transform (IFFT) blocks 320a, . . . , and 320n, a plurality of insert guard interval window blocks 322a, . . . , and 322n, and a plurality of radio front end (RFE) blocks 324a, . . . , and 324n. The transmitter 206 may be substantially similar to the transmitter 206 described in FIG. 2.

The scrambler 302 may comprise suitable logic, circuitry, and/or code that may enable scrambling of a pattern of binary 0's and 1's contained within transmitted data to prevent long sequences of consecutive 0's or 1's. The encoder parser 304 may comprise suitable logic, circuitry, and/or code that may enable receiving bits from a single input stream, and distributing each of the bits to one of a plurality of output streams.

The encoder/puncture block 306a may comprise suitable logic, circuitry, and/or code that may enable received data to be encoded to enable error correction. An encoder/puncture block 306a may encode data based on a forward error correction (FEC) coding method, such as binary convolutional coding (BCC), or low density parity check (LDPC) coding. The FEC coding method may generate encoded data, which may be characterized by a coding rate. The coding rate may represent a measure based on the number of received data bits and the number of encoded data bits. The encoder/puncture block 306a may also perform puncturing of encoded data to modify the coding rate, for example, to change a ½ coding rate to a ¾ coding rate. The encoder/puncture block 306n may be substantially similar to the encoder/puncture block 506a.

The stream parser 308 may comprise suitable logic, circuitry, and/or code that may receive one or more input data streams, and distribute each bit from each input data stream to one of a plurality of spatial streams. The interleaver 310a may comprise suitable logic, circuitry, and/or code that may enable reordering of bits in a received spatial stream. The interleaver 310a may reorder bits such that if binary values for a block of contiguous transmitted bits are corrupted during transmission, the individual bits may be corrected by an FEC coding method at a receiving station, which receives the block of corrupted bits. At the receiving station, the received block of corrupted contiguous bits may be separated by a deinterleaver. After separation, a single corrupted bit may be contiguous with a block of non-corrupted bits. The separation of corrupted bits may enable a FEC coding method to correct the binary values of the bits, which may have been corrupted during transmission. The interleaver 310n may be substantially similar to the interleaver 310a.

The constellation mapper block 312a may comprise suitable logic, circuitry, and/or code that may enable a sequence of bits in a received data stream to be mapped to a selected constellation point. The selected constellation point may be determined based on a modulation type utilized for transmitting data associated with the spatial stream, for example 64-level quadrature amplitude modulation (64-QAM). The selected constellation point may be referred to as an individual data symbol. For example, for 64-QAM, the constellation mapper block 312a may receiver a sequence of six bits, determine a binary value for the sequence of six bits, and select a constellation point, which may correspond to the binary value. When the transmitter utilizes orthogonal frequency division multiplexing (OFDM), the constellation mapper 312a may enable the generation of OFDM symbols. An OFDM symbol may comprise a plurality of individual data symbols. The OFDM symbol may be generated by selecting a plurality of frequency carriers associated with an RF channel, such as a downlink channel, and generating an individual data symbol corresponding to each selected frequency carrier associated with the downlink channel. The constellation mapper block 312a may output a spatial stream comprising a sequence of OFDM symbols, which may be generated at sequential time instants. The constellation mapper block 312n may be substantially similar to the constellation mapper block 312a.

The STBC/SFBC block 314 may comprise suitable logic, circuitry, and/or code that may enable reception of symbols from a plurality of input spatial streams and generation of a plurality of space time streams or a plurality of space frequency streams. In instances when STBC may be utilized by the transmitter 204 in an exemplary 4×1 diversity transmission system, the STBC/SFBC block 314 may receive a sequence of symbols, $x(t_0)$, $x(t_1)$, $x(t_2)$ and $x(t_3)$, from a single spatial stream at distinct time instants $t_0$, $t_1$, $t_2$ and $t_3$ respectively, for example. During a first exemplary output cycle, the STBC/SFBC block 314 may output a codeword $s(0,0)=x(t_0)$, via a first space time stream, a codeword $s(1,1)=x^*(t_1)$, via a second space time stream, a codeword $s(2,2)=x(t_2)$, via a third space time stream and a codeword $s(3,3)=x^*(t_3)$, via a fourth space time stream. During a second exemplary output cycle, the STBC/SFBC block 314 may output a codeword $s(0,1)=x(t_1)$, via the first space time stream, a codeword $s(1,0)=-x^*(t_0)$, via the second space time stream, a codeword $s(2,3)=x(t_3)$, or via the third space time stream and a codeword $s(3,2)=-x^*(t_2)$, via the fourth space time stream.

When SFBC is utilized by the transmitter 204 in the 4×1 diversity transmission system, the STBC/SFBC block 314 may receive an OFDM symbol, $x(t_i)$, via a single spatial stream at a given time instant $t_i$, which comprises individual data symbols associated with a plurality a frequency carriers, $f_0$, $f_1$, $f_2$, $f_3$, . . . , and $f_{N_{fc}}$, for example $x(f_0)$, $x(f_1)$, $x(f_2)$, $x(f_3)$, . . . , and $x(f_{N_{fc}})$, where $N_{fc}$ may represent the number of frequency carriers. The STBC/SFBC block 314 may output codewords $s(i,k)$, where each of the transmitting antennas i may output a codeword that comprises individual data symbols associated with a tone group k. An exemplary codeword s(i,k) may comprise individual data symbols $x(f_{j(k)})$, or $x^*(f_{j(k)})$, where $$j(k) = k, k + N_{sts}, k + 2 \cdot N_{sus}, \ldots, k + \left(\left\lceil \frac{N_{fc}}{N_{sts}} \right\rceil - 1\right) \cdot N_{sts},$$

for $N_{fc}$ number of frequency carriers and $N_{sts}$ number of space time streams, for example. The set of values j(k), may be associated with a tone group, as represented by a tone group index k, where k=0, 1, 2, . . . , $N_{sts}$-1. Thus, during a first exemplary output cycle where $N_{sts}$=4, the STBC/SFBC block 314 may output a codeword $s(0,0)=x(f_{j(0)})$ via a first space time stream, a codeword $s(1,1)=x^*(f_{j(1)})$ via a second space time stream, a codeword $s(2,2)=x(f_{j(2)})$ via a third space time stream and a codeword $s(3,3)=x^*(f_{j(3)})$ via a fourth space time stream. During a second exemplary output cycle, the STBC/SFBC block 314 may output a codeword $s(0,1)=x(f_{j(1)})$ via a first space time stream, a codeword $s(1,0)=-x^*(f_{j(0)})$ via a second space time stream, a codeword $s(2,3)=x(f_{j(3)})$ via a third space time stream and a codeword $s(3,2)=-x^*(f_{j(2)})$ via a fourth space time stream.

In various embodiments of the invention, the STBC/SFBC block 314 may enable generation of an angle rotated, or phase rotated version of a codeword. The angle rotated version of the codeword may then be output to the corresponding space time stream.

The CSD block 316 may comprise suitable logic, circuitry and/or code that may enable input of a stream, and output of a time-shifted version of the stream. For example, the CSD block 316 may receive an input stream and output a time-delayed version of the received input stream.

The IFFT block 320a may comprise suitable logic, circuitry and/or code that may enable calculations, based on an IFFT algorithm, to transform a frequency-domain representation of an input signal to generate output signals, which may comprise a time-domain representation of the input signal. The IFFT block 320n may be substantially similar to the IFFT block 320a.

The insert GI window block 322a may comprise suitable logic, circuitry and/or code that may enable receipt of an input signal and generation of an output signal by insertion of guard intervals in the received input signal. The input signal may comprise a sequence of symbols. The guard interval may represent a time interval between individual symbols, which may establish a minimum time duration between the end of one symbol and the beginning of a succeeding symbol. The insert GI window block 322n may be substantially similar to the insert GI window block 322a.

The RFE block 324a may comprise suitable logic, circuitry, and/or code that may enable reception of an input signal, and generation of an RF output signal. The RFE block 324a may generate the RF output signal by utilizing a channel frequency carrier signal to upconvert the input signal. The channel frequency carrier signal may have a frequency, $f_{Ch}$. In an exemplary OFDM transmission system, the channel frequency carrier signal may be applied to upconvert the input signal such that half of the $N_{fc}$ number of OFDM frequency carriers may be upconverted to frequencies lower than $f_{Ch}$, and half of the $N_{fc}$ number of OFDM frequency carriers may be upconverted to frequencies higher than $f_{Ch}$. Within a transmitter 204, which may be compliant with IEEE 802.11 standards, the RFE block 324a may enable generation of 20 MHz bandwidth RF signal, or of 40 MHz bandwidth RF signal, for example. The RFE block 324a may enable amplification of the RF output signal and subsequent transmission of the amplified signal via the transmitting antenna 232a. The RFE block 324n may be substantially similar to the RFE block 324a. The transmitting antenna 232n may be substantially similar to the transmitting antenna 232a.

In operation, the processor 206 may send data to the scrambler block 302. The scrambled data from the scrambler block 202 may be sent to the encoder parser block 304. The encoder parser 304 may distribute the scrambled data among the encoder/parser blocks 306a . . . 306n. The processor 206 may send control signals to configure the encoder/puncture blocks 306a . . . 306n by selecting a coding rate and/or puncture rate. The processor 206 may select a different coding rate and/or puncture rate for each spatial stream. Each of the plurality of encoder/puncture blocks 306a . . . 306n may generate a corresponding encoded stream. The spatial parser 308 may receive the plurality of encoded streams and distribute bits contained in the received encoded streams among a plurality of $N_{ss}$ spatial streams. In an exemplary embodiment of the invention, $N_{ss}$=1, however, various embodiments of the invention may not be so limited and may be practiced for systems in which $N_{ss}$>1.

For each of the generated spatial streams the interleaver 310a may reorder the sequence of bits in the received spatial stream to generate a bit-interleaved spatial stream. The constellation mapper 312a may receive the bit-interleaved spatial stream from the interleaver 310a and generate a modulated spatial stream, which may comprise a sequence of symbols. The processor 206 may send control signals to configure the constellation mapper 312a by selecting a modulation type and/or a number of frequency carriers $N_{fc}$. The number of frequency carriers may determine the bandwidth of the RF signal, which may ultimately be transmitted by the transmitter 204. For an exemplary 20 MHz bandwidth RF signal, $N_{fc}$=56, while for an exemplary 40 MHz RF signal $N_{fc}$=112.

The processor 206 may send control signals to configure the STBC/SFBC block 314. The STBC/SFBC block 314 may be configured for STBC operation or SFBC operation, for example. For either STBC or SFBC operation in a diversity transmission system AP 102, the STBC/SFBC block 314 may be configured to apply a specified angle rotation to codewords generated for selected space time streams. In various embodiments of the invention the specified angle rotation may be determined at the AP 102 based on feedback information received from the STA 104. For SFBC operation, for example, the STBC/SFBC block 314 may distribute frequency carriers contained within each received symbol among the $N_{sts}$ space time streams. The plurality of space time streams may be sent to the CSD block 316.

The processor 206 may send control signals to configure the CSD block 316. The CSD block 316 may be configured to insert time delays to change the relative time relation between the individual space time steams. In a diversity transmission system, the CSD block 316 may be configured to prevent beamforming among RF output signals concurrently transmitted by an AP 102.

The IFFT blocks 320a . . . 320n may perform IFFT conversion on a corresponding one of the time shifted space time streams generated by the CSD block 316. Each of the IFFT blocks 320a . . . 320n may generate a time domain signal. The insert GI window block 322a . . . 322n may insert a minimum time spacing between consecutive symbols contained in a corresponding received time domain signal. Each of the RFE blocks 324a . . . 324n may generate an RF output signals from an input signal received from a corresponding one of the insert GI window blocks 322a . . . 322n. The processor 206 may send control signals to each of the RFE blocks 324a . . .

324n to configure a channel frequency, $f_{Ch}$, which may be utilized to upconvert the received input signal. Each of the RFE blocks 324a . . . 324n may transmit an amplified RF signal via a corresponding transmitting antenna 232a . . . 232n.

In an exemplary embodiment of the invention, each of the $N_{sts}$ space time streams may enable generation of a corresponding RF output signal. The sequence of signals comprising a single space time stream to a corresponding RF output signal may be referred to as a transmit (TX) chain. Thus, in the exemplary embodiment of the invention, $N_{sts}=N_{TX}$ where $N_{TX}$ may refer to the number of TX chains. In an exemplary embodiment of the invention the number of TX chains may equal the number of transmitting antennas 232a . . . 232n. In an exemplary embodiment of the invention, $N_{TX}=4$, however various embodiments of the invention may not be so limited and may be practiced for systems in which $N_{TX}<4$ or $N_{TX}>4$. A configuration in which $N_{TX}>N_{ss}$ may be referred to as a diversity transmission system. The exemplary $N_{ss}=1$ and $N_{TX}=4$ system may be referred to as a 4×1 diversity transmission system.

In an exemplary embodiment of the invention in which the AP 102 and STA 104 utilize TDD communication, the processor 206 of FIG. 2 within the AP 102 may compute a rotation angle, θ, based on uplink signals received from the STA 104. In an exemplary embodiment of the invention in which the AP 102 and STA 104 utilize TDD or FDD communication, the processor 206 within the AP 102 may compute θ based on channel feedback information contained within the uplink signals received from the STA 104.

Various embodiments of the invention may be practiced in a range of wired or wireless communication systems. As an example, various aspects of the invention may be practiced in a cellular communication network.

Figure 4:
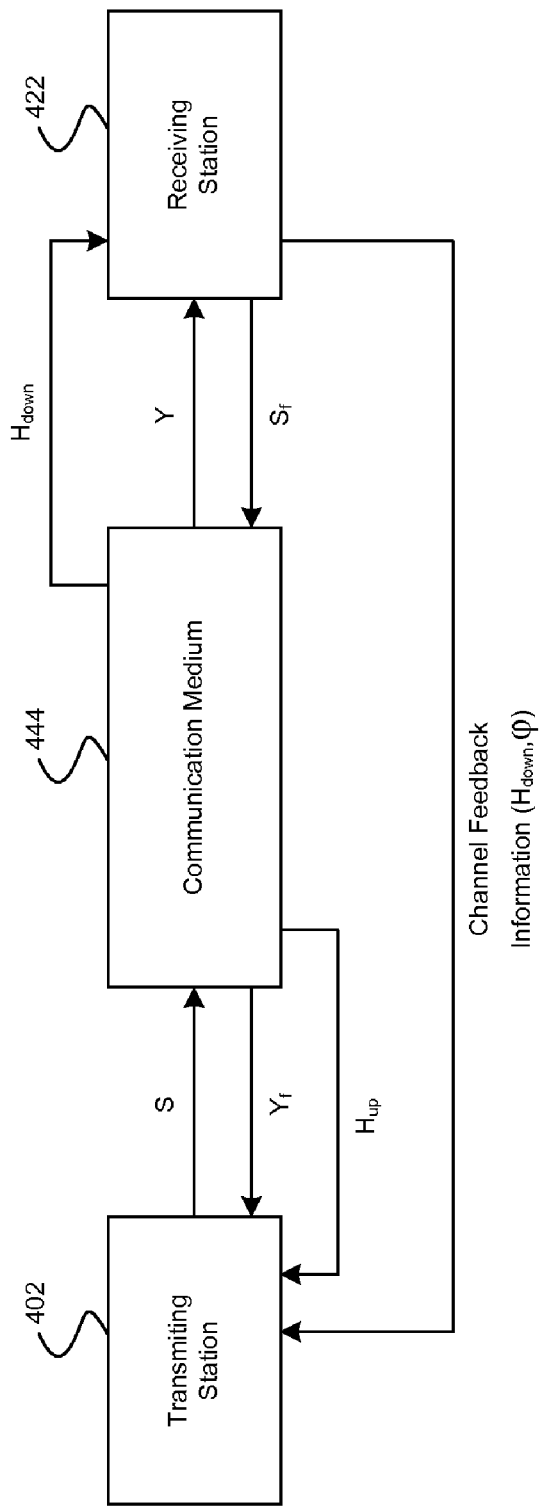
FIG. 4 is an exemplary diagram illustrating channel feedback, which may be utilized in connection with an embodiment of the invention.

FIG. 4 is an exemplary diagram illustrating channel feedback, which may be utilized in connection with an embodiment of the invention. Referring to FIG. 4, there is shown a transmitting station 402, a receiving station 422, and a communications medium 444. The communications medium 444 may represent a wireless communications medium. The transmitting station 402 may represent an AP 102 and the receiving station may represent an STA 104, for example. The transmitting station 402 may transmit a signal vector S to the receiving station 422 via the communications medium 444. The communications direction from the transmitting station 402 to the receiving station 422 may be referred to as a downlink direction. The signal vector S may comprise a plurality of TX chain signals simultaneously transmitted via one or more transmitting antennas. The signal vector S may travel through the communications medium 444. The signal vector S may be altered while traveling through the communications medium 444. The transmission characteristics associated with the communications medium 444 may be characterized by a transfer function, H. The signal vector S may be altered based on the transfer function H. In the downlink direction, the transfer function H may be referred to as $H_{down}$. The altered signal vector S may be represented as the signal Y. The receiving station 422 may receive the signal Y. The receiving station 422 may compute one or more transfer coefficient values, $h_i$, associated with the transfer function $H_{down}$ based on the signal Y received via the communications medium 444.

The receiving station 422 may compute a rotation angle φ based on the transfer function $H_{down}$. The receiving station 422 may communicate the computed transfer function $H_{down}$ and/or rotation feedback information φ to the transmitting station 402 as channel feedback information ($H_{down}$, φ). The receiving station 422 may communicate the channel feedback information ($H_{down}$, φ) via a transmitted signal vector $S_f$. The transmitted signal vector $S_f$ may be transmitted to the transmitting station 402 via the communications medium 444. The signal vector $S_f$ may be altered while traveling through the communications medium 444. The communications direction from the receiving station 422 to the transmitting station 402 may be referred to as an uplink direction. The signal vector $S_f$ may be altered based on the transfer function H. In the uplink direction, the transfer function H may be referred to as $H_{up}$. The altered signal vector $S_f$ may be represented as the signal $Y_f$. The transmitting station 402 may receive the signal $Y_f$. The transmitting station 402 may utilize the channel feedback information ($H_{down}$, φ) to compute a rotation angle θ, which may be utilized to generate subsequent transmitted RF signals S. In various embodiments of the invention, θ=φ. An angle rotation value, c, may be determined based on the rotation angle θ, such that $c=e^{jθ}$, when θ is determined by channel feedback information with $H_{down}$ or angle feedback with φ. Alternatively, c may be feedback as a complex value rather than an angle.

In various embodiments of the invention, the transmitted signal S may comprise a plurality of concurrently transmitted signal groups. Each signal within the signal group may comprise a codeword that is transmitted by a transmitting antenna 232a in a diversity transmission system. Over a specified time duration, the plurality of concurrently transmitted signal groups may comprise an orthogonally coded group of signals. In an exemplary 4×1 diversity transmission system, the orthogonally coded signal group may comprise four concurrently transmitted signal groups where each signal group is transmitted in a consecutive time sequence. The orthogonally coded signal group may be generated based on the rotation angle θ. The rotation angle θ may be determined based on feedback information.

The transmitting station 402 may compute one or more values associated with the transfer function $H_{up}$ based on the signal $Y_f$ received via the communications medium 444. The transmitting station 402 may utilize the computed transfer function $H_{up}$ to compute the rotation angle θ. In this regard, the transmitting station 402 may compute the rotation angle without utilizing channel feedback information. The rotation angle θ, computed without utilizing channel feedback information, may be utilized to generate subsequent transmitted RF signals S.

With quasi-orthogonal STBC/SFBC, the values of the coefficients in the transfer matrix H may display identifiable patterns. For example, in a 4×1 diversity transmission system, which utilizes quasi-orthogonal STBC or SFBC, the codewords may be transmitted in such a pattern that the effective transfer function matrix, $H_{eff}$, may represented as an ABBA, or AB(−B*)A* pattern, where A and B are as shown in the following equations:

$$A = \begin{bmatrix} h_0 & h_1 \\ h_1^* & -h_0^* \end{bmatrix} \quad [1a]$$

$$B = \begin{bmatrix} h_2 & h_3 \\ h_3^* & -h_2^* \end{bmatrix} \quad [1b]$$

and $H_{eff}$ represented as:

$$H_{eff} = \begin{bmatrix} A & B \\ B & A \end{bmatrix} \quad [2a]$$

or:

$$H_{eff} = \begin{bmatrix} A & B \\ -B^* & A^* \end{bmatrix} \quad [2a]$$

where A* refers to a conjugate of A, and $h_i$ refers to the channel between the $i^{th}$ transmitting antenna and the receiving antenna. The ABBA pattern is represented in equation [2a], while the AB(-B*)A* pattern is represented in equation [2b].

The sequence of codewords for the ABBA pattern of equation [2a] may be represented as a matrix, S, as shown in the following equation:

$$S = \begin{bmatrix} s(0,0) & s(0,1) & s(0,2) & s(0,3) \\ s(1,0) & s(1,1) & s(1,2) & s(1,3) \\ s(2,0) & s(2,1) & s(2,2) & s(2,3) \\ s(3,0) & s(3,1) & s(3,2) & s(3,3) \end{bmatrix} = \begin{bmatrix} x_0 & -x_1^* & x_2 & -x_3^* \\ x_1 & x_0^* & x_3 & x_2^* \\ x_2 & -x_3^* & x_0 & -x_1^* \\ x_3 & x_2^* & x_1 & x_0^* \end{bmatrix} \quad [3a]$$

where each row, i, represents an antenna and each column, j, represents a time instant. Thus, each column represents the codewords transmitted by the plurality of four transmitting antennas within the 4×1 diversity transmission system at a given time instant. The variable $x_i$ represents an original sequence and S is a 4×4 block of codewords to be transmitted. For STBC, the index, j, refers to a data symbol within the original data stream. For SFBC, the index, j, refers to a tone group. The signal received at the receiving station, Y, may be represented as in the following equation:

$$\begin{bmatrix} y_0 \\ y_1 \\ y_2 \\ y_3 \end{bmatrix} = [h_0 \ h_1 \ h_2 \ h_3] \begin{bmatrix} x_0 & -x_1^* & x_2 & -x_3^* \\ x_1 & x_0^* & x_3 & x_2^* \\ x_2 & -x_3^* & x_0 & -x_1^* \\ x_3 & x_2^* & x_1 & x_0^* \end{bmatrix} \quad [3b]$$

The signal received at the receiving station, Y, may also be represented as shown in the following equation:

$$\begin{bmatrix} y_0 \\ y_1^* \\ y_2 \\ y_3^* \end{bmatrix} = \begin{bmatrix} h_0 & h_1 & h_2 & h_3 \\ h_1^* & -h_0^* & h_3^* & -h_2^* \\ h_2 & h_3 & h_0 & h_1 \\ h_3^* & -h_2^* & h_1^* & -h_0^* \end{bmatrix} \begin{bmatrix} x_0 \\ x_1 \\ x_2 \\ x_3 \end{bmatrix} + \begin{bmatrix} n_0 \\ n_1 \\ n_2 \\ n_3 \end{bmatrix} \quad [4]$$

where the signal vector Y is represented as a set of constituent signal components, $y_i$, $n_i$ represents signal noise and each value i represents a time instant.

The first term on the right hand side of equation [4] represents the effective transfer function matrix, $H_{eff}$. The second term on the right hand side of equation [4] represents an original sequence transmitted in the form of 4×4 block codewords, S, in order to exploit the transmit diversity gain. The left hand side of equation [4] represents the received signal $y_i$ at each time instant i. The equation [4] is a representation of the signals S, as shown in equation [3a], which are transmitted by the plurality of transmitting antennas across a range of time instants.

For the AB(-B*)A* pattern, equations [3a] and [4] may be represented as shown in the following equations:

$$S = \begin{bmatrix} s(0,0) & s(0,1) & s(0,2) & s(0,3) \\ s(1,0) & s(1,1) & s(1,2) & s(1,3) \\ s(2,0) & s(2,1) & s(2,2) & s(2,3) \\ s(3,0) & s(3,1) & s(3,2) & s(3,3) \end{bmatrix} = \begin{bmatrix} x_0 & -x_1^* & x_2 & -x_3^* \\ x_1 & x_0^* & x_3 & x_2^* \\ x_2^* & -x_3 & -x_0^* & x_1 \\ x_3^* & x_2 & -x_1^* & -x_0 \end{bmatrix} \quad [5]$$

$$\begin{bmatrix} y_0 \\ y_1^* \\ y_2^* \\ y_3 \end{bmatrix} = \begin{bmatrix} h_0 & h_1 & h_2 & h_3 \\ h_1^* & -h_0^* & h_3^* & -h_2^* \\ -h_2^* & -h_3^* & h_0^* & h_1^* \\ -h_3 & h_2 & h_1 & -h_0 \end{bmatrix} \begin{bmatrix} x_0 \\ x_1 \\ x_2^* \\ x_3^* \end{bmatrix} + \begin{bmatrix} n_0 \\ n_1 \\ n_2 \\ n_3 \end{bmatrix} \quad [6]$$

The task of determining estimated values $x_j$ in equation [6] based on received signals $y_i$ may be computationally complex in order to suppress the off-diagonal crosstalk, even when quasi-orthogonal STBC or SFBC are utilized.

Figure 5:
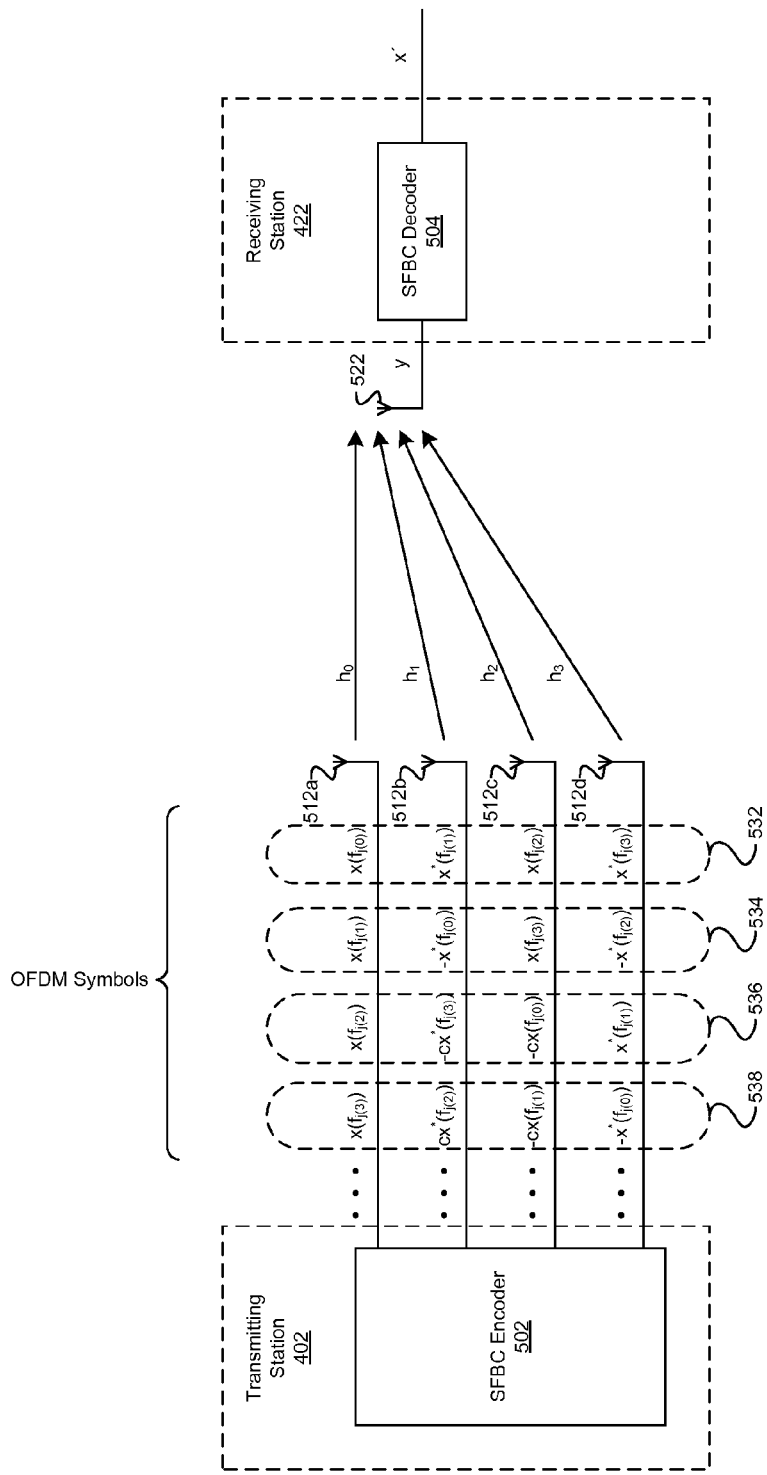
FIG. 5 is an exemplary block diagram of SFBC with diversity transmission, in accordance with an embodiment of the invention.

FIG. 5 is an exemplary block diagram of SFBC with diversity transmission, in accordance with an embodiment of the invention. Referring to FIG. 5, there is shown a transmitting station 402 and a receiving station 422. The transmitting station 402 may comprise an SFBC encoder 502. The transmitting station 402 may utilize diversity transmission by simultaneously transmitting a plurality of RF output signals via at least a portion of the transmitting antennas 512a, 512b, 512c and 512d. Each RF output signal may comprise a codeword. The simultaneously transmitted plurality of RF output signals may form a signal group. The codewords within a signal group may be combined to form an OFDM symbol. For the exemplary transmitting station 402 shown in FIG. 5, $N_{sts}=N_{TX}=4$. The receiving station 422 may comprise an SFBC decoder 504. The receiving station 422 may receive signals via a receiving antenna 522.

At successive time instants, the transmitting station 402 may utilize SFBC to transmit OFDM symbols 532, 534, 536 and 538. When transmitting OFDM symbol 532, the transmitting station 402 may transmit a codeword comprising individual data symbols $x(f_{j(0)})$ via transmitting antenna 512a, where $$j(0) = 0, 4, 8, \ldots, \left(\left\lceil \frac{N_{fc}}{4} \right\rceil - 1\right) \cdot 4.$$

The transmitting station 402 may transmit a codeword comprising individual data symbols $x^*(f_{j(1)})$ via transmitting antenna 512b, where x* may refer to a complex conjugate of x and $$j(1) = 1, 5, 9, \ldots, \left(\left\lceil \frac{N_{fc}}{4} \right\rceil - 1\right) \cdot 4 + 1.$$

The transmitting station 402 may also transmit a codeword comprising individual data symbols $x(f_{j(2)})$ via transmitting antenna 512c where $$j(2) = 2, 6, 10, \ldots, \left(\left\lceil \frac{N_{fc}}{4} \right\rceil - 1\right) \cdot 4 + 2,$$

and a codeword comprising individual data symbols $x^*(f_{j(3)})$ via transmitting antenna 512d where $$j(3) = 3, 7, 11, \ldots, \left(\left\lceil \frac{N_{fc}}{4} \right\rceil - 1\right) \cdot 4 + 3.$$

When transmitting OFDM symbol 534, the transmitting station 402 may transmit a codeword comprising individual data symbols $x(f_{j(1)})$ via transmitting antenna 512a, a codeword comprising individual data symbols $-x^*(f_{j(0)})$ via transmitting antenna 512b, a codeword comprising individual data symbols $x(f_{j(3)})$ via transmitting antenna 512c, and a codeword comprising individual data symbols $-x^*(f_{j(2)})$ via transmitting antenna 512d. When transmitting OFDM symbol 536, the transmitting station 402 may transmit a codeword comprising individual data symbols $x(f_{j(2)})$ via transmitting antenna 512a, and a codeword comprising individual data symbols $-c \cdot x^*(f_{j(3)})$ via transmitting antenna 512b, where c may refer to an angle rotation value as shown in the following equation:

$$c = e^{j\theta} \quad [7]$$

where θ may refer to an angle rotation value.

The transmitting station 402 may also transmit a codeword comprising individual data symbols $-c \cdot x(f_{j(0)})$ via transmitting antenna 512c, and a codeword comprising individual data symbols $x(f_{j(1)})$ via transmitting antenna 512d. When transmitting OFDM symbol 538, the transmitting station 402 may transmit a codeword comprising individual data symbols $x(f_{j(3)})$ via transmitting antenna 512a, a codeword comprising individual data symbols $c \cdot x^*(f_{j(2)})$ via transmitting antenna 512b, a codeword comprising individual data symbols $-c \cdot x(f_{j(1)})$ via transmitting antenna 512c, and a codeword comprising individual data symbols $-x^*(f_{j(0)})$ via transmitting antenna 512d.

Signals traveling through the communication medium to the receiving station 422, which were transmitted via the transmitting antenna 512a, may be modified based on the transfer coefficient factor, $h_0$. Signals communicated via the transmitting antenna 512b over the transmission medium may be modified based on the transfer coefficient factor, $h_1$. Signals communicated via the transmitting antenna 512c over the transmission medium may be modified based on the transfer coefficient factor, $h_2$ and signals communicated via the transmitting antenna 512d over the transmission medium may be modified based on the transfer coefficient factor, $h_3$.

In a quasi-orthogonal STBC or SFBC system, the values of the coefficients in the effective transfer function matrix $H_{eff}$ may display any of a plurality of identifiable patterns. Examples of identifiable patterns include, but are not limited to ABBA and AB(−B*)A*. A matrix $H_{sq} = H_{eff}^+ \times H_{eff}$ may be computed, where $H^+$ represents a complex conjugate transpose (or Hermitian transform) of the matrix H, as shown in the following equations:

$$H_{sq} = \begin{bmatrix} \sum_{i=1}^{4}|h_i|^2 & 0 & \delta & 0 \\ 0 & \sum_{i=1}^{4}|h_i|^2 & 0 & \delta^* \\ \delta & 0 & \sum_{i=1}^{4}|h_i|^2 & 0 \\ 0 & \delta^* & 0 & \sum_{i=1}^{4}|h_i|^2 \end{bmatrix} \quad [8]$$

or:

$$H_{sq} = \begin{bmatrix} \sum_{i=1}^{4}|h_i|^2 & 0 & 0 & \eta \\ 0 & \sum_{i=1}^{4}|h_i|^2 & -\eta^* & 0 \\ 0 & -\eta^* & \sum_{i=1}^{4}|h_i|^2 & 0 \\ \eta & 0 & 0 & \sum_{i=1}^{4}|h_i|^2 \end{bmatrix} \quad [9]$$

where the quantity $|h_i|$ represents the magnitude of $h_i$.

A receiving station STA 104 may compute estimated values for codewords s(i,k), s(i,k)′, by multiplying the received signal vector Y by the appropriate matrix $H_{eff}^+$. For example, for Y as shown in equation [4]:

$$w_0 = \left(\sum_{i=1}^{4}|h_i|^2\right) \cdot x_0 + \delta \cdot x_2 + p_0 \quad [10a]$$

where $w_0$ may represent the first row in the matrix generated by the matrix product $H^+Y$, which may be represented as shown in the following equation:

$$w_0 = h_0^* \cdot y_0 + h_1 \quad y_1^* + h_2^* \cdot y_2 + h_3 \cdot y_3^* \quad [10b]$$

and:

$$p_0 = h_0^* \cdot n_0 + h_1 \cdot n_1 + h_2^* \cdot n_2 + h_3 \cdot n_3 \quad [10c]$$

In the exemplary SFBC system shown in FIG. 5, $x_0 = x(f_{j(0)})$ and $x_2 = x(f_{j(2)})$.

The existence of the crosstalk term in equation [10a] may increase the complexity of determining an estimated value for $x_0$ at a receiving station STA 104, for example. In general, the term δ in equation [8] introduces crosstalk terms, which may increase the complexity of determining estimated values for $x_k$. Similarly, when $H_{eff}$ is represented by an AB(−B*)A* pattern, for example, the term η introduces crosstalk terms, which may increase the complexity of determining estimated values for $x_k$. Conventional methods, which may be utilized to cancel the crosstalk may include maximum likelihood (ML) techniques or successive interference cancellation (SIC), for example. In various embodiments of the invention, an angle rotation coefficient value c may be computed such that the value for the crosstalk terms may be approximately equal to zero.

In various embodiments of the invention, a new transfer function matrix, $H_{new}$, may be computed as shown in the following equation:

$$H_{new} = H_{eff} \otimes C \quad [11]$$

where $H_{eff}$ may represent the effective transfer function matrix; the matrix C may represent a matrix of angle rotation coefficients, c, where each angle rotation coefficient c may be defined as shown in equation [7]; and the new transfer function matrix $H_{new}$ may be computed as a Hadamard product of the matrices H and C as shown in equation [11].

For an exemplary effective transfer function matrix, $H_{eff}$, which may be represented by an ABBA pattern, such as the exemplary 4×4 matrix $H_{eff}$ as shown in equation [2a], corresponding C matrices may be determined as shown in the following equations:

$$C = \begin{bmatrix} 1 & 1 & 1 & 1 \\ 1 & 1 & 1 & 1 \\ c & 1 & 1 & c \\ 1 & c^* & c^* & 1 \end{bmatrix} \quad [12a]$$

$$C = \begin{bmatrix} 1 & 1 & 1 & 1 \\ 1 & 1 & 1 & 1 \\ 1 & c^* & c^* & 1 \\ c & 1 & 1 & c \end{bmatrix} \quad [12b]$$

$$C = \begin{bmatrix} 1 & c^* & c^* & 1 \\ c & 1 & 1 & c \\ 1 & 1 & 1 & 1 \\ 1 & 1 & 1 & 1 \end{bmatrix} \quad [12c]$$

$$C = \begin{bmatrix} c & 1 & 1 & c \\ 1 & c^* & c^* & 1 \\ 1 & 1 & 1 & 1 \\ 1 & 1 & 1 & 1 \end{bmatrix} \quad [12d]$$

$$C = \begin{bmatrix} 1 & 1 & 1 & 1 \\ 1 & 1 & 1 & 1 \\ 1 & c & c & 1 \\ 1 & c & c & 1 \end{bmatrix} \quad [12e]$$

$$C = \begin{bmatrix} 1 & 1 & 1 & 1 \\ 1 & 1 & 1 & 1 \\ c & 1 & 1 & c \\ c & 1 & 1 & c \end{bmatrix} \quad [12f]$$

$$C = \begin{bmatrix} c & 1 & 1 & c \\ c & 1 & 1 & c \\ 1 & 1 & 1 & 1 \\ 1 & 1 & 1 & 1 \end{bmatrix} \quad [12g]$$

$$C = \begin{bmatrix} 1 & c & c & 1 \\ 1 & c & c & 1 \\ 1 & 1 & 1 & 1 \\ 1 & 1 & 1 & 1 \end{bmatrix} \quad [12h]$$

For an exemplary effective transfer function matrix, $H_{eff}$, which may be represented by an AB(-B*)A* pattern, such as the exemplary 4×4 matrix $H_{eff}$ as shown in equation [2b], corresponding C matrices may be determined as shown in the following equations:

$$C = \begin{bmatrix} 1 & 1 & 1 & 1 \\ 1 & 1 & 1 & 1 \\ c & 1 & c & 1 \\ 1 & c^* & 1 & c^* \end{bmatrix} \quad [13a]$$

$$C = \begin{bmatrix} 1 & 1 & 1 & 1 \\ 1 & 1 & 1 & 1 \\ 1 & c & 1 & c \\ c^* & 1 & c^* & 1 \end{bmatrix} \quad [13b]$$

$$C = \begin{bmatrix} c & 1 & c & 1 \\ 1 & c^* & 1 & c^* \\ 1 & 1 & 1 & 1 \\ 1 & 1 & 1 & 1 \end{bmatrix} \quad [13c]$$

$$C = \begin{bmatrix} 1 & c & 1 & c \\ c^* & 1 & c^* & 1 \\ 1 & 1 & 1 & 1 \\ 1 & 1 & 1 & 1 \end{bmatrix} \quad [13d]$$

$$C = \begin{bmatrix} 1 & 1 & 1 & 1 \\ 1 & 1 & 1 & 1 \\ 1 & c & 1 & c \\ 1 & c & 1 & c \end{bmatrix} \quad [13e]$$

$$C = \begin{bmatrix} 1 & 1 & 1 & 1 \\ 1 & 1 & 1 & 1 \\ c & 1 & c & 1 \\ c & 1 & c & 1 \end{bmatrix} \quad [13f]$$

$$C = \begin{bmatrix} 1 & c & 1 & c \\ 1 & c & 1 & c \\ 1 & 1 & 1 & 1 \\ 1 & 1 & 1 & 1 \end{bmatrix} \quad [13g]$$

$$C = \begin{bmatrix} c & 1 & c & 1 \\ c & 1 & c & 1 \\ 1 & 1 & 1 & 1 \\ 1 & 1 & 1 & 1 \end{bmatrix} \quad [13h]$$

In various embodiments of the invention, the matrix C is not limited to the expressions shown in equations [12] and [13]. In general, various embodiments of the invention may be practiced in connection with M×N diversity transmission systems in which the determined matrix C may be represented as various combinations for an M×M matrix. Furthermore, various embodiments of the invention may be practiced when the matrix $H_{eff}$ is not represented by an ABBA pattern or AB(-B*)A* pattern.

In various embodiments of the invention, the angle rotation coefficient, c, may be computed in equations [12] based on the value δ, where an exemplary value δ may be computed for a 4×1 diversity transmission system as shown in equation [8]. In various other embodiments of the invention, the angle rotation coefficient, c, may be computed in equations [13] based on the value η, where an exemplary value η may be computed for a 4×1 diversity transmission system as shown in equation [9]. For variables δ or η, which may be expressed as an equation in the form a−c·a* or a−c*·a*, the value c may be computed as shown in the following equation:

$$c = e^{j \cdot 2 \cdot angle(a)} \quad [14a]$$

for the form represented as a−c·a*, or:

$$c = e^{-j \cdot 2 \cdot angle(a)} \quad [14b]$$

for the form represented as a−c*·a*.

where the variable a may be a complex quantity, which may be represented by a magnitude, mag(a), and phase angle, angle(a), as shown in the following equation:

$$a = mag(a) \cdot e^{j \cdot angle(a)} \quad [15]$$

For an exemplary ABBA matrix $H_{eff}$ and exemplary matrix C, a matrix $H_{new}$ may be determined as in the following equation:

$$\begin{bmatrix} h_0 & h_1 & h_2 & h_3 \\ h_1^* & -h_0^* & h_3^* & -h_2^* \\ h_2 & h_3 & h_0 & h_1 \\ h_3^* & -h_2^* & h_1^* & -h_0^* \end{bmatrix} \otimes \begin{bmatrix} 1 & 1 & 1 & 1 \\ 1 & 1 & 1 & 1 \\ c & 1 & 1 & c \\ 1 & c^* & c^* & 1 \end{bmatrix} = \quad [16]$$

$$\begin{bmatrix} h_0 & h_1 & h_2 & h_3 \\ h_1^* & -h_0^* & h_3^* & -h_2^* \\ c \cdot h_2 & h_3 & h_0 & c \cdot h_1 \\ h_3^* & -c^* \cdot h_2^* & c^* \cdot h_1^* & -h_0^* \end{bmatrix}$$

the crosstalk term δ may be represented as shown in the following equation:

$$\delta = h_0^* \cdot h_2 + h_1 \cdot h_3^* + c^* \cdot (h_0^* \cdot h_2 + h_1 \cdot h_3^*)^* \quad [17]$$

In various embodiments of the invention, the value for c may be determined such that the crosstalk term δ=0. The computed value for c which may meet this condition may be represented as shown in the following equation:

$$c = \exp(-j \cdot (2 \cdot \text{angle}(h_0^* \cdot h_2 + h_1 \cdot h_3^*) + \pi)) \quad [18]$$

For an exemplary AB(−B*)A* matrix $H_{\text{eff}}$ and exemplary matrix C, a matrix $H_{\text{new}}$ may be determined as in the following equation:

$$\begin{bmatrix} h_0 & h_1 & h_2 & h_3 \\ h_1^* & -h_0^* & h_3^* & -h_2^* \\ -h_2^* & -h_3^* & h_0^* & h_1^* \\ -h_3 & h_2 & h_1 & -h_0 \end{bmatrix} \otimes \begin{bmatrix} 1 & 1 & 1 & 1 \\ 1 & 1 & 1 & 1 \\ c & 1 & c & 1 \\ 1 & c^* & 1 & c^* \end{bmatrix} = \quad [19]$$

$$\begin{bmatrix} h_0 & h_1 & h_2 & h_3 \\ h_1^* & -h_0^* & h_3^* & -h_2^* \\ -c \cdot h_2^* & -h_3 & c \cdot h_0^* & h_1^* \\ -h_3 & c^* \cdot h_2 & h_1 & -c^* \cdot h_0 \end{bmatrix}$$

the crosstalk term η may be represented as shown in the following equation:

$$\eta = h_0^* \cdot h_3 + h_1 \cdot h_2^* + c^* \cdot (h_0^* \cdot h_3 + h_1 \cdot h_2^*)^* \quad [20]$$

In various embodiments of the invention, the value for c may be determined such that the crosstalk term η≈0. The computed value for c which may meet this condition may be represented as shown in the following equation:

$$c = \exp(-j \cdot (2 \cdot \text{angle}(h_0^* \cdot h_3 + h_1 \cdot h_2^*) + \pi)) \quad [21]$$

In various embodiments of the invention, the selection of a rotation angle for which the corresponding value for c results in the crosstalk term δ=0 or η=0 may simplify the task of detecting data at a receiving station 422 in response to data transmitted by a transmitting station 402. In various embodiments of the invention, for signals transmitted by the transmitting station 402 and received at the received station for δ=0:

$$w_0 = \left(\sum_{i=1}^{4} |h_i|^2\right) \cdot x_0 + p_0 \quad [22]$$

where $w_0$ and $p_0$ may be computed by methods substantially similar to equations [10b] and [10c].

As shown in equation [22], the term $w_0$, which may represent a weighted sum of signals received over a plurality of time instants, may be a function of the single codeword $x_0 = x$ ($f_{j(0)}$). In general, the term $w_k$ may be a function of a single corresponding codeword, for example $x_k = x(f_{j(k)})$. In this regard, the sequence of signals transmitted over a time window from a transmitting station 402 via the plurality of transmitting antennas may comprise an orthogonal set of transmitted signals. The ability to compute a relationship between a received composite signal $w_k$, and a single codeword $x(f_{j(k)})$ may result in simplified signal processing at the receiving station 422. In various embodiments of the invention, a receiving station 422 may detect estimated values for the signals, which transmit the codewords $x(f_{j(k)})$, by utilizing a simplified minimum mean squared error (MMSE) algorithm. The simplifications in the MMSE algorithm may be enabled by selecting values for the angle rotation variable c, which enable the crosstalk terms to be approximately equal to a value of zero. In various embodiments of the invention, the receiving station 422 may utilize the simplified MMSE algorithm while achieving received signal processing performance levels, as measured by PER and/or BER, for example, which may be comparable to receiving stations, which may utilize more computationally complex MLSE or SIC techniques.

In various embodiments of the invention, codewords ±x ($f_{j(k)}$) or ±c·x($f_{j(k)}$) may be transmitted by a transmitting station 402 by utilizing a given transmitting antenna, while codewords ±x*($f_{j(k\pm 1)}$), ±x*($f_{j(k+N_{TX})}$), ±c·x*($f_{j(k\pm 1)}$) or ±c·x* ($f_{j(k+N_{TX})}$) may be transmitted by a preceding or succeeding transmitting antenna. Each of the codewords may be represented as s(i,k), where i may represent an index, which refers to one of the transmitting antennas, 512a, 512b, 512c and 512d, at the transmitting station 402 and k may refer to a tone group transmitted by the referenced transmitting antenna at a given time instant. Thus, codewords transmitted in the sequence of OFDM symbols 532, 534, 536 and 538 may be represented as a matrix S as shown in the following equation:

$$S = \begin{bmatrix} s(0,0) & s(0,1) & s(0,2) & s(0,3) \\ s(1,0) & s(1,1) & s(1,2) & s(1,3) \\ s(2,0) & s(2,1) & s(2,2) & s(2,3) \\ s(3,0) & s(3,1) & s(3,2) & s(3,3) \end{bmatrix} \quad [23]$$

$$= \begin{bmatrix} x(f_{j(0)}) & x(f_{j(1)}) & x(f_{j(2)}) & x(f_{j(3)}) \\ x^*(f_{j(1)}) & -x^*(f_{j(0)}) & -c \cdot x^*(f_{j(3)}) & c \cdot x^*(f_{j(2)}) \\ x(f_{j(2)}) & x(f_{j(3)}) & -c \cdot x(f_{j(0)}) & -c \cdot x(f_{j(1)}) \\ x^*(f_{j(3)}) & -x^*(f_{j(2)}) & x^*(f_{j(1)}) & -x^*(f_{j(0)}) \end{bmatrix}$$

where c may be as defined such that the crosstalk term δ or η may be approximately equal to zero; each row in the matrix S may refer to a transmitting antenna, and each column may represent the codewords transmitted by the plurality of transmitting antennas at a given time instant (i.e. a signal group). The variable $x(f_{j(k)})$ may represent a codeword. For STBC, the index, k, may refer to a data symbol within the original data stream. For SFBC, the index, k, may refer to a tone group (for example, the tone group represented by the group of frequencies, $f_{j(k)}$, for $$j(k) = k, k + N_{sts}, k + 2 \cdot N_{sts}, \ldots, k + \left(\left\lceil \frac{N_{fc}}{N_{sts}} \right\rceil - 1\right) \cdot N_{sts},$$

for $N_{fc}$ number of frequency carriers and $N_{sts}$ number of space time streams).

The corresponding matrix C, for the matrix S as shown in equation [23], may be represented as shown in the following equation:

$$C = \begin{bmatrix} 1 & 1 & 1 & 1 \\ 1 & 1 & 1 & 1 \\ c & 1 & 1 & c \\ 1 & c^* & c^* & 1 \end{bmatrix} \quad [24]$$

for a model set of transmitted codewords/data symbols as shown in the following equation:

$$X = \begin{bmatrix} x(f_{j(0)}) \\ x^*(f_{j(1)}) \\ x(f_{j(2)}) \\ x^*(f_{j(3)}) \end{bmatrix} \quad [25a]$$

and for a set of received signals as shown in the following equation:

$$Y = \begin{bmatrix} y_0 \\ y_1^* \\ y_2 \\ y_3^* \end{bmatrix} \quad [25b]$$

a transfer function matrix, $H_{\mathit{eff}}$, which may enable reconstruction of the sequence of transmitted codewords/data symbols 532, 534, 536 and 538 may be represented as shown in the following equation:

$$H_{\mathit{eff}} = \begin{bmatrix} h_0 & h_1 & h_2 & h_3 \\ -h_1^* & h_0^* & -h_3^* & h_2^* \\ -h_2 & h_3 & h_0 & -h_1 \\ -h_3^* & -h_2^* & h_1^* & h_0^* \end{bmatrix} \quad [26a]$$

and a matrix $H_{new}$ may be determined as shown in equation [11]:

$$H_{new} = \begin{bmatrix} h_0 & h_1 & h_2 & h_3 \\ -h_1^* & h_0^* & -h_3^* & h_2^* \\ -c \cdot h_2 & h_3 & h_0 & -c \cdot h_1 \\ -h_3^* & -c \cdot h_2^* & c^* \cdot h_1^* & h_0^* \end{bmatrix} \quad [26b]$$

for which the crosstalk term, δ, may be computed as shown in the following equation:

$$\delta = h_0^* \cdot h_2 - h_1 \cdot h_3^* - c^* \cdot (h_0^* \cdot h_2 - h_1 \cdot h_3^*)^* \quad [27]$$

and a value c for which δ=0 may be computed as shown in the following equation:

$$c = \exp(-j \cdot 2 \cdot \text{angle}(h_0^* \cdot h_2 + h_1 \cdot h_3^*)) \quad [28]$$

where the rotation angle θ, as shown in equation [7], may be computed as shown in the following equation:

$$\theta = 2 \cdot \text{angle}(h_0^* \cdot h_2 + h_1 \cdot h_3^*) \quad [29]$$

Various embodiments of the invention comprise a system in which an orthogonally coded group of signals (as represented in equation [23], for example) transmitted by a transmitting station 402, via a communication medium characterized by a plurality of transfer coefficients $H = h_i$, and received by a receiving station 422 may be represented by a model set of transmitted codewords (as represented in equation [25a], for example), an effective transfer matrix $H_{\mathit{eff}}$ (as represented in equation [26a], for example), a rotation matrix C (as represented in equation [24], for example) and a received signal vector Y (as represented in equation [25b], for example). The receiving station 422 may derive an orthogonal set of signals (as shown in equations [8], [9] and [10]) by multiplying a received signal (as represented by the received signal vector Y) by an Hermitian-transformed version of the new transfer matrix $H_{new}$ (as shown in equation [26b]), $H_{new}^+$. The angle rotation value, c, contained within the matrix C, as represented in equation [24] for example, may be determined at the transmitting station 402 based on feedback information received from the receiving station 422.

In one aspect, the matrix C, as represented in equation [24] for example, may indicate at which time instants selected signals in the model of codewords may be rotated based on the angle rotation value c. Each row in the matrix C may represent a distinct time instant, while each column may represent a distinct transmitting antenna at the transmitting station 402. For example, the first row may represent a time instant to, the second row may represent time instant $t_1$, the third row may represent time instant $t_2$ and the fourth row may represent time instant $t_3$. Similarly, the first column may represent signals transmitted from the transmitting antenna 512a over the time duration $t_0$-$t_3$, the second column may represent signals transmitted from the transmitting antenna 512b over the time duration $t_0$-$t_3$, the third column may represent signals transmitted from the transmitting antenna 512c over the time duration $t_0$-$t_3$ and the fourth column may represent signals transmitted from the transmitting antenna 512d over the time duration $t_0$-$t_3$, for example. The time duration $t_0$-$t_3$ may represent the time window for generating the plurality of concurrently transmitting signal groups, which form an orthogonally coded group of signals. The model set of transmitted codewords shown in equation [25a] represent a concurrently transmitted group of codewords.

The third row and first column in the exemplary matrix C of equation [24] indicates that the model codeword transmitted by the antenna 512a is to be angle rotated based on the angle rotation coefficient c when the third set of concurrently transmitted signal groups is transmitted at the time instant $t_2$. When SFBC is utilized at the transmitting station 402, the rotated codeword may comprise a tone group k=0. When STBC is utilized at the transmitting station, the rotated codeword may comprise a data symbol in a spatial stream at a time index k=0. The third row and fourth column in the exemplary matrix C indicates that the model codeword transmitted by the antenna 512d is also to be angle rotated based c when the third set of concurrently transmitted signal groups is transmitted at the time instant $t_2$. When SFBC is utilized at the transmitting station 402, the rotated codeword s(3,3) may comprise a tone group k=3. When STBC is utilized at the transmitting station, the rotated codeword may comprise a data symbol in a spatial stream at a time index k=3.

The fourth row and second column in the exemplary matrix C indicates that the model codeword transmitted by the antenna 512b is to be angle rotated based on the complex conjugate of the angle rotation coefficient c, c*, when the fourth set of concurrently transmitted signal groups is transmitted at the time instant $t_3$. When SFBC is utilized at the transmitting station 402, the rotated codeword may comprise a tone group k=1. When STBC is utilized at the transmitting station, the rotated codeword may comprise a data symbol in a spatial stream at a time index k=1. The fourth row and third column in the exemplary matrix C indicates that the model codeword transmitted by the antenna 512c is also to be angle rotated based on c*, when the fourth set of concurrently transmitted signal groups is transmitted at the time instant $t_3$. When SFBC is utilized at the transmitting station 402, the rotated codeword may comprise a tone group k=2. When STBC is utilized at the transmitting station, the rotated codeword may comprise a data symbol in a spatial stream at a time index k=2.

The orthogonally coded group of signals (equation [23]) may comprise a plurality of concurrently transmitted signal groups, 532, 534, 536 and 538. Each of the signal groups may comprise a plurality of concurrently transmitted codewords, which may be transmitted by the transmitting station 402 at a given time instant. Each column shown in equation [23] may comprise a plurality of codewords that form a plurality of concurrently transmitted codewords. When taken over a consecutive sequence of four time instants (corresponding to $N_{sts}=N_{TX}=4$), the plurality of concurrently transmitted signal groups 532, 534, 536 and 538 may form the orthogonally coded group of signals as shown in equation [23].

In various embodiments of the invention, the receiving station 422 may compute an estimated transfer function matrix $H_{down}$ based on a received signal Y (FIG. 4). The receiving station 422 may subsequently compute values for $H_{sq}$. The receiving station 422 may ultimately compute a rotation angle $\theta_{down}$ by a method substantially as shown in equation [28]. The receiving station 422 may communicate the computed rotation angle, $\theta_{down}$, to the transmitting station 402 in channel feedback information. The transmitting station may utilize the received rotation angle to compute a rotation value, c as shown in equation [7]. In an exemplary embodiment of the invention, the rotation value c may enable the transmitting station 402 to generate a subsequent sequence of codewords/data symbols, which may be selectively rotated as shown in equation [26]. The transmitted sequence of selectively rotated codewords/data symbols transmitted concurrently via the plurality of transmitting antennas 512a, 512b, 512c and 512d as shown in equation [23] may comprise an orthogonally coded set of data signals. The orthogonally coded set of data signals may enable the receiving station 422 to utilize simplified MMSE processing techniques to determine estimated values for individual codewords/data symbols transmitted by the transmitting station 402. The receiving station 422 may dynamically send updated rotation angle values in channel feedback information to the transmitting station 402. The transmitting station 402 may utilize the updated rotation angle values to compute new rotation values, c, in addition to transmitted updated sets of orthogonally coded signals.

In an exemplary embodiment of the invention, the rotation value, c, may be represented as a single bit value. For example:

$$\text{if } (|\text{Re}(h_0^* \cdot h_2 + h_1 \cdot h_3^*)| > |\text{Im}(h_0^* \cdot h_2 + h_1 \cdot h_3^*)|) \quad [30]$$
$$c = 1; \quad /^* \theta = 0, \text{angle}(a) = 0 \ */$$
$$\text{else}$$
$$c = -1; \quad /^* \theta = \pi, \text{angle}(a) = \frac{1}{2}\pi \ */$$

In various other exemplary embodiments of the invention, the transmitting station 402 may compute an estimated transfer function matrix $H_{up}$ based on signals $Y_f$ received from the receiving station 422. The transmitting station 402 may then compute a rotation angle $\theta_{up}$ by a method substantially as shown in equation [28]. The transmitting station 402 may utilize the computed rotation angle $\theta_{up}$ to compute a rotation value c, which may subsequently be utilized to generate a set of orthogonally coded signals. The transmitting station 402 may update the value for the rotation angle $\theta_{up}$ based on subsequently received signals $Y_f$. The updated rotation angle $\theta_{up}$ may be utilized to transmit updated sets of orthogonally coded signals. The receiving station 422 may utilize the computed rotation angle $\theta_{down}$ to receive the orthogonally coded signals generated at the transmitting station 402 based on the computed rotation angle $\theta_{up}$.

Figure 6:
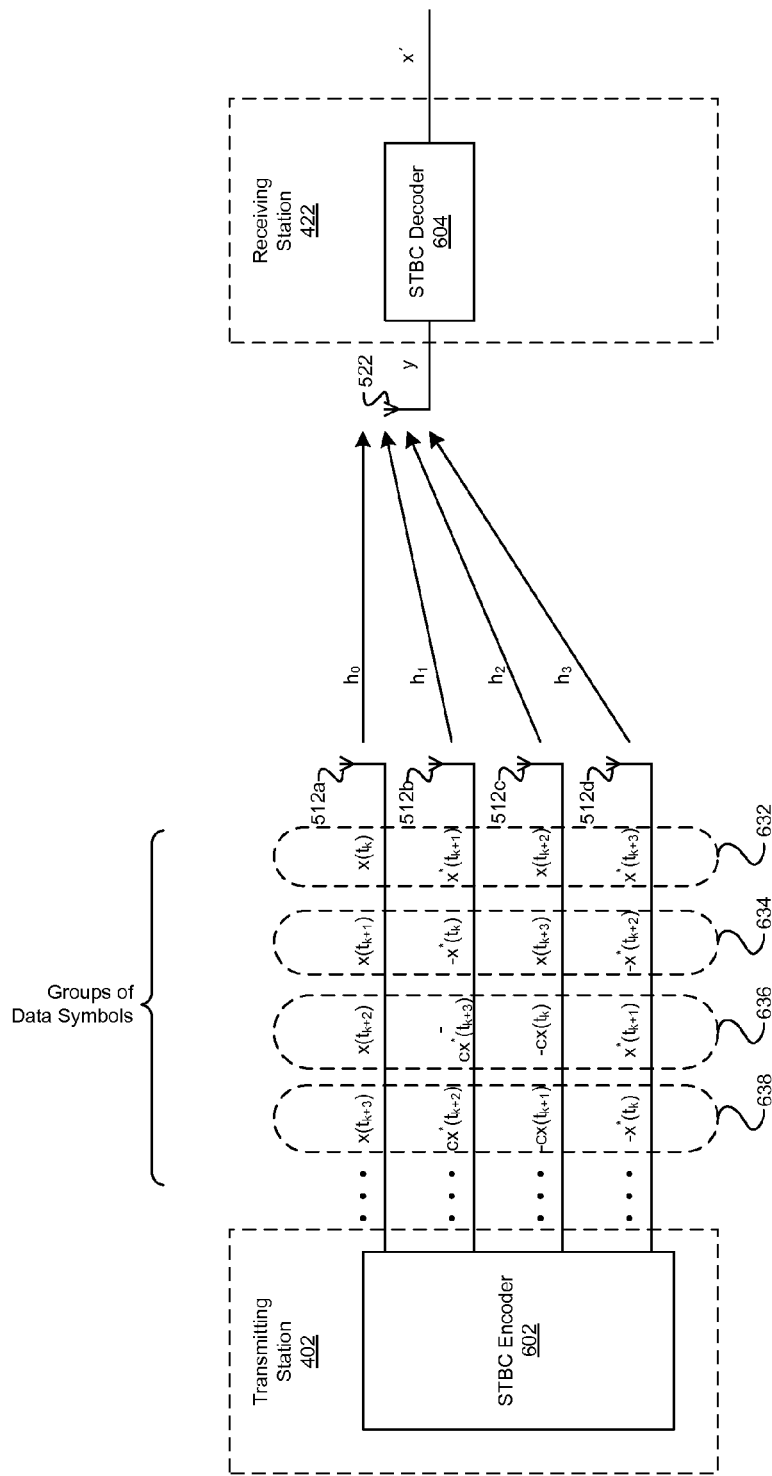
FIG. 6 is an exemplary block diagram of STBC with diversity transmission, in accordance with an embodiment of the invention.

FIG. 6 is an exemplary block diagram of STBC with diversity transmission, in accordance with an embodiment of the invention. Referring to FIG. 6, there is shown a transmitting station 402 and a receiving station 422. The transmitting station 402 may comprise an STBC encoder 602. The transmitting station 402 may utilize diversity transmission by simultaneously transmitting a plurality of RF output signals via at least a portion of the transmitting antennas 512a, 512b, 512c and 512d. The receiving station 422 may comprise an STBC decoder 604. The receiving station 422 may receive signals via a receiving antenna 522.

At successive time instants, the transmitting station 402 may utilize STBC to concurrently transmit groups of data symbols 632, 634, 636 and 638. In an exemplary embodiment of the invention, each of the individual data symbols $x(t_k)$ may comprise an OFDM symbol, which occurs within a data stream at a time instant $t_k$. Thus, in a 4×1 STBC diversity transmission system, a plurality of data symbols $x(t_k)$, $x(t_{k+1})$, $x(t_{k+2})$ and $x(t_{k+3})$, which occur within a single data stream at time instants $t_k$, $t_{k+1}$, $t_{k+2}$ and $t_{k+3}$, may be concurrently transmitted via the plurality of transmitting antennas 512a, 512b, 512c and 512d. When transmitting the group of data symbols 632, the transmitting station 402 may transmit a codeword $s(0,k)=x(t_k)$ via transmitting antenna 512a, and a codeword $s(1,k+1)=x^*(t_{k+1})$ via transmitting antenna 512b, where x* may refer to a complex conjugate of x. The transmitting station 402 may also transmit a codeword $s(2,k+2)=x(t_{k+2})$ via transmitting antenna 512c, and a codeword $s(3,k+3)=x^*(t_{k+3})$ via transmitting antenna 512d.

When transmitting the group of data symbols 634, the transmitting station 402 may transmit a codeword $s(0,k+1)=x(t_{k+1})$ via transmitting antenna 512a, and a codeword $s(1,k)=-x^*(t_k)$ via transmitting antenna 512b. The transmitting station 402 may also transmit a codeword $s(2,k+3)=x(t_{k+3})$ via transmitting antenna 512c, and a codeword $s(3,k+2)=-x^*(t_{k+2})$ via transmitting antenna 512d.

When transmitting the group of data symbols 636, the transmitting station 402 may transmit a codeword $s(0,k+2)=x(t_{k+2})$ via transmitting antenna 512a, and a codeword $s(1,k+3)=-c \cdot x^*(t_{k+3})$ via transmitting antenna 512b. The transmitting station 402 may also transmit a codeword $s(2,k)=-c \cdot x(t_k)$ via transmitting antenna 512c, and a codeword $s(3,k+1)=x^*(t_{k+1})$ via transmitting antenna 512d. The variable c may be defined as shown in equation [7].

When transmitting the group of data symbols 638, the transmitting station 402 may transmit a codeword $s(0,k+3)=x(t_{k+3})$ via transmitting antenna 512a, and a codeword $s(1,k+2)=c \cdot x^*(t_{k+2})$ via transmitting antenna 512b. The transmitting station 402 may also transmit a codeword $s(2,k+1)=-c \cdot x(t_{k+1})$ via transmitting antenna 512c, and a codeword $s(3,k)=-x^*(t_k)$ via transmitting antenna 512d.

In various embodiments of the invention, the operation of an STBC diversity transmission system for transmission of orthogonally coded signals based on angle feedback may be substantially similar to the operation of the SFBC diversity transmission system described above and with reference to equations [7]-[30].

Figure 7:
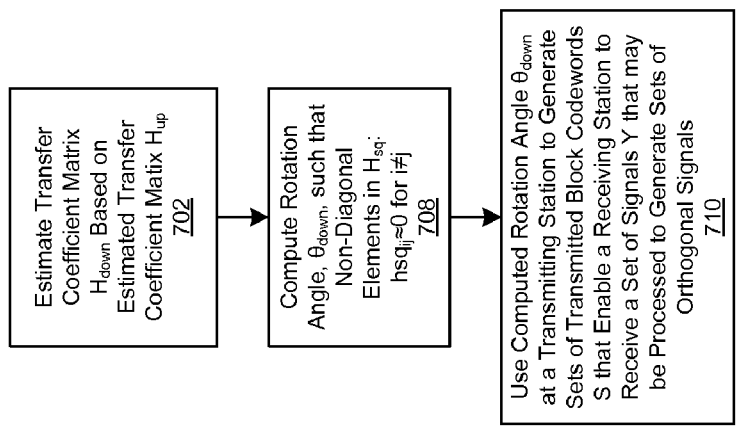
FIG. 7 is a flowchart illustrating exemplary steps for transmission of orthogonally coded signals for TDD communication, in accordance with an embodiment of the invention.

FIG. 7 is a flowchart illustrating exemplary steps for transmission of orthogonally coded signals for TDD communication, in accordance with an embodiment of the invention. In a system for TDD communication the transmitting station 402 may compute an angle rotation value $\theta_{down}$ without receiving angle rotation values in channel feedback information. Referring to FIG. 7, in step 702, the transmitting station 402 may compute an estimated transfer function matrix $H_{down}$ based on a computed transfer matrix $H_{up}$. The transfer function matrix $H_{down}$ may be computed at the transmitting station 402 based on an assumption of channel reciprocity, for example:

$$H_{down} = H_{up} \quad [31]$$

In step 708, the transmitting station 402 may compute a rotation angle $\theta_{up}$ such that the non-diagonal elements in the matrix $H_{sq}$, $hsq_{ij}=0$ for $i \neq j$, where $H_{sq}$ is determined as shown in equation [9]. In step 710, the transmitting station 402 may utilize the computed rotation angle $\theta_{up}$ to generate sets of transmitted block codewords S, which may enable a receiving station 422 to receive a set of signals y, which may be processed to generate orthogonal sets of signals.

Figure 8:
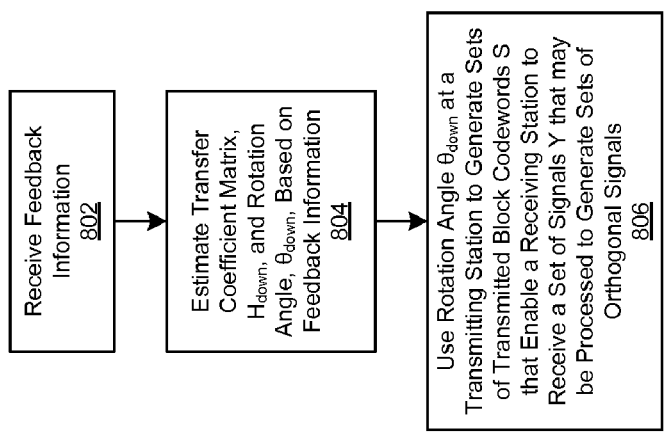
FIG. 8 is a flowchart illustrating exemplary steps for transmission of orthogonally coded signals for FDD communication, in accordance with an embodiment of the invention.

FIG. 8 is a flowchart illustrating exemplary steps for transmission of orthogonally coded signals for FDD communication, in accordance with an embodiment of the invention. In a system for FDD communication the transmitting station 402 may compute an angle rotation value $\theta_{down}$ based on channel feedback information received from a receiving station 422. Referring to FIG. 8, in step 802, the transmitting station 402 may receive channel feedback information from the receiving station 422. In step 804, the transmitting station 402 may compute an estimated transfer function matrix $H_{down}$ and/or rotation angle $\theta_{down}$ based on the channel feedback information. In step 806, the transmitting station 402 may utilize the computed rotation angle $\theta_{down}$ to generate sets of transmitted block codewords S, which may enable a receiving station 422 to receive a set of signals y, which may be processed to generate orthogonal sets of signals.

Figure 9:
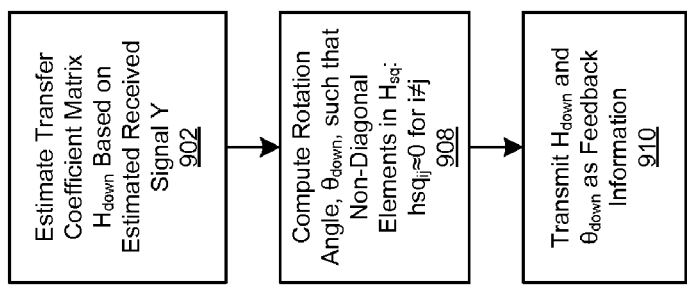
FIG. 9 is a flowchart illustrating exemplary steps for computation of channel feedback information in a system for transmission of orthogonally coded signals, in accordance with an embodiment of the invention.

FIG. 9 is a flowchart illustrating exemplary steps for computation of channel feedback information in a system for transmission of orthogonally coded signals, in accordance with an embodiment of the invention. Referring to FIG. 9, in step 902, the receiving station 422 may compute an estimated transfer function matrix $H_{down}$ based on a set of received signals Y. In step 908, the receiving station 422 may compute a rotation angle $\theta_{down}$ such that the non-diagonal elements in the matrix $H_{sq}$, $hsq_{ij}=0$ for $i \neq j$. In step 910, the receiving station 422 may transmit the computed rotation angle $\theta_{down}$ to within channel feedback information to the transmitting station 402.

Figure 10:
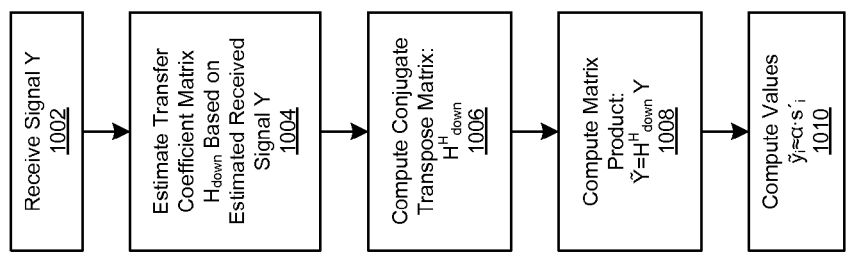
FIG. 10 is a flowchart illustrating exemplary steps for reception of orthogonally coded signals, in accordance with an embodiment of the invention.

FIG. 10 is a flowchart illustrating exemplary steps for reception of orthogonally coded signals, in accordance with an embodiment of the invention. Referring to FIG. 10, in step 1002, the receiving station 422 may receive a set of signals Y. In step 1004, the receiving station 422 may compute an estimated transfer function matrix $H_{up}$ based on the set of received signals Y. In step 1006, the receiving station 422 may compute a conjugate transpose matrix $H^H_{down}$. In step 1008, the receiving station 422 may compute a product matrix $\tilde{Y} = H^H_{down} \times Y$. In step 1010, the receiving station 422 may compute a set of values $\tilde{y}_i \approx \alpha \cdot x_k'$, as shown in equation [22], for example.

Aspects of a system for SFBC/STBC transmission of orthogonally coded signals with angle feedback in a diversity transmission system may comprise at least one processor 206 that enables generation of a plurality of concurrently transmitted signal groups based on a computed matrix such that a product of the plurality of concurrently transmitted signal groups, the computed matrix and/or a transformed version of the computed matrix, may generate at least one set of orthogonal signals based on at least one rotation angle. In an exemplary embodiment of the invention, each column in the matrix S shown in equation [23] may represent a concurrently transmitted signal group. The signals may be transmitted concurrently via the plurality of transmitting antennas 512a, 512b, 512c and/or 512d. The rows in the matrix S may represent an orthogonally coded set of signals. The columns in the matrix S may represent a time window for generation of the orthogonally coded set of symbols.

Each of the generated plurality of concurrently transmitted signal groups may be generated based on a sequence of individual data symbols or a sequence of codewords. A statistically computed value for each of the sequence of individual data symbols, or codewords, may be proportional to a computed weighted average value of the generated at least one set of orthogonally coded signals as shown in equation [22], for example. The weighted average value may computed based on the computed matrix, for example the transfer function matrix H. The transmitter 204 may enable generation of the plurality of concurrently transmitted signal groups based on at least one data stream. For example, in a 4×1 diversity transmitting system, the transmitter 204 may receive a signal spatial stream signal and generate four transmit chain signals. For SFBC communication, each of the concurrently transmitted codewords may comprise a distinct portion of tones, and corresponding data associated with those tones. The distinct portion of the tones and corresponding data may be contained within an individual data symbol, which may be received from a data steam, for example a spatial stream.

The processor 206 may enable computation of the computed matrix based on a transfer function, for example the transfer function H, which may characterize a communications medium 444 for transmitting the plurality of concurrently transmitted signal groups. At any given time instant, the processor 206 may enable rotation, or phase shifting, of at least a portion of the generated plurality of concurrently transmitted signal groups based on the rotation angle, for example θ. Referring to equation [23], each row may represent a concurrently transmitted signal group at a given time instant. Signal components, $x_k$, which are multiplied by the rotation value, c, may represent rotated, or phase shifted signals. The value for c may be computed based on the phase rotation angle. The rotation angle may be computed at a transmitting station 402 such that non-diagonal matrix elements in a square matrix, for example the computed matrix $H_{sq}$, may be equal to zero. The square matrix may be computed based on the computed matrix, for example the matrix $H_{new}$, and a transformed version of the computed matrix, for example the Hermitian matrix $H_{new}^H$. Alternatively, the processor 206 may enable computation of the rotation angle based on channel feedback information received from the receiving station 422.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Aspects of a machine-readable storage having stored thereon, a computer program having at least one code section for processing signals in a communication system, the at least one code section being executable by a machine for causing the machine to perform steps comprising generating a plurality of concurrently transmitted signal groups based on a computed matrix such that a product of the plurality of concurrently transmitted signal groups, the computed matrix and/or a transformed version of the computed matrix, may generate at least one set of orthogonally coded signals based on at least one rotation angle.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
    performing by one or more circuits:
        generating, over a time window, a plurality of concurrently transmitted signal groups by selectively rotating a portion of a plurality of signal groups based on a computed matrix associated with a codeword transmission pattern, wherein said computed matrix is computed based on at least one rotation angle; and
        transmitting said plurality of concurrently transmitted signal groups, wherein said plurality of concurrently transmitted signal groups enable a receiver to generate at least one set of orthogonal signals by multiplying received signals, said received signals based on said plurality of concurrently transmitted signal groups, and a transformed version of said computed matrix.

2. The method according to claim 1, comprising generating each of said generated plurality of concurrently transmitted signal groups based on a sequence of data symbols or a sequence of codewords.

3. The method according to claim 2, wherein a statistically computed value for each of said sequence of data symbols is proportional to a computed weighted average value of said transmitted plurality of concurrently transmitted signal groups.

4. The method according to claim 3, wherein said computed weighted average value is computed based on said computed matrix.

5. The method according to claim 2, wherein a statistically computed value for each of said sequence of codewords is proportional to a computed weighted average value of said transmitted plurality of concurrently transmitted signal groups.

6. The method according to claim 5, wherein said computed weighted average value is computed based on said computed matrix.

7. The method according to claim 1, comprising generating said plurality of concurrently transmitted signal groups based on at least one data stream.

8. The method according to claim 7, wherein each concurrently transmitted codeword within said plurality of concurrently transmitted signal groups comprises a distinct portion of tones, and corresponding data, contained within a data symbol from said at least one data stream.

9. The method according to claim 1, comprising computing said computed matrix based on a transfer function, which characterizes a communication medium utilized for transmitting said plurality of concurrently transmitted signal groups.

10. The method according to claim 1, comprising rotating or phase shifting, at a given time instant, at least a portion of said generated plurality of concurrently transmitted signal groups based on said at least one rotation angle.

11. The method according to claim 1, comprising computing said at least one rotation angle such that non-diagonal matrix elements in a computed square matrix are equal to zero.

12. The method according to claim 11, comprising computing said square matrix computed based on a mathematical product of said computed matrix and said transformed version of said computed matrix.

13. The method according to claim 1, comprising computing said at least one rotation angle based on channel feedback information.

14. A system for processing signals in a communication system, the system comprising:
    one or more circuits that are operable to generate, over a time window, a plurality of concurrently transmitted signal groups by selectively rotating of a portion of a plurality of signal groups based on a computed matrix associated with a codeword transmission pattern, wherein said computed matrix is computed based on at least one rotation angle; and
    said one or more circuits are operable to transmit said plurality of concurrently transmitted signal groups, wherein said plurality of concurrently transmitted signal groups enable a receiver to generate at least one set of orthogonal signals by multiplying received signals, said received signals based on said plurality of concurrently transmitted signal groups, and a transformed version of said computed matrix.

15. The system according to claim 14, wherein said one or more circuits are operable to generate each of said generated plurality of concurrently transmitted signal groups based on a sequence of data symbols or a sequence of codewords.

16. The system according to claim 15, wherein a statistically computed value for each of said sequence of data symbols is proportional to a computed weighted average value of said transmitted plurality of concurrently transmitted signal groups.

17. The system according to claim 16, wherein said computed weighted average value is computed based on said computed matrix.

18. The system according to claim 15, wherein a statistically computed value for each of said sequence of codewords is proportional to a computed weighted average value of said transmitted plurality of concurrently transmitted signal groups.

19. The system according to claim 18, wherein said computed weighted average value is computed based on said computed matrix.

20. The system according to claim 14, wherein said one or more circuits are operable to generate said plurality of concurrently transmitted signal groups based on at least one data stream.

21. The system according to claim 20, wherein each concurrently transmitted codeword within said plurality of concurrently transmitted signal groups comprises a distinct portion of tones, and corresponding data, contained within a data symbol from said at least one data stream.

22. The system according to claim 14, wherein said one or more circuits are operable to compute said computed matrix based on a transfer function, which characterizes a communication medium for transmitting said plurality of concurrently transmitted signal groups.

23. The system according to claim 14, wherein said one or more circuits are operable to rotate, or phase shifting, at a given time instant, at least a portion of said generated plurality of concurrently transmitted signal groups based on said at least one rotation angle.

24. The system according to claim 14, wherein said one or more circuits are operable to compute said at least one rotation angle such that non-diagonal matrix elements in a computed square matrix are equal to zero.

25. The system according to claim 24, wherein said one or more circuits are operable to compute said square matrix computed based on a mathematical product of said computed matrix and said transformed version of said computed matrix.

26. The system according to claim 14, wherein said one or more circuits are operable to compute said at least one rotation angle based on channel feedback information.

27. The system according to claim 14, wherein said one or more circuits comprise at least one processor and/or transmitter.

28. A method for processing signals in a communication system, the method comprising:
performing by one or more circuits:
generating, over a time window, a plurality of concurrently transmitted signal groups based on a computed matrix, wherein said computed matrix is computed based on at least one rotation angle;
transmitting said plurality of concurrently transmitted signal groups, wherein said plurality of concurrently transmitted signal groups enable a receiver to generate at least one set of orthogonal signals by multiplying received signals, said received signals based on said plurality of concurrently transmitted signal groups, and a transformed version of said computed matrix; and
generating each of said generated plurality of concurrently transmitted signal groups based on a sequence of data symbols or a sequence of codewords, wherein a statistically computed value for each of said sequence of data symbols is proportional to a computed weighted average value of said transmitted plurality of concurrently transmitted signal groups.

29. The method according to claim 28, wherein said computed weighted average value is computed based on said computed matrix.

30. A method for processing signals in a communication system, the method comprising:
performing by one or more circuits:
generating, over a time window, a plurality of concurrently transmitted signal groups based on a computed matrix, wherein said computed matrix is computed based on at least one rotation angle;
transmitting said plurality of concurrently transmitted signal groups, wherein said plurality of concurrently transmitted signal groups enable a receiver to generate at least one set of orthogonal signals by multiplying received signals, said received signals based on said plurality of concurrently transmitted signal groups, and a transformed version of said computed matrix; and
generating each of said generated plurality of concurrently transmitted signal groups based on a sequence of data symbols or a sequence of codewords, wherein a statistically computed value for each of said sequence of codewords is proportional to a computed weighted average value of said transmitted plurality of concurrently transmitted signal groups.

31. The method according to claim 30, wherein said computed weighted average value is computed based on said computed matrix.

32. A system for processing signals in a communication system, the system comprising:
one or more circuits that are operable to generate, over a time window, a plurality of concurrently transmitted signal groups based on a computed matrix, wherein said computed matrix is computed based on at least one rotation angle;
said one or more circuits are operable to transmit said plurality of concurrently transmitted signal groups, wherein said plurality of concurrently transmitted signal groups enable a receiver to generate at least one set of orthogonal signals by multiplying received signals, said received signals based on said plurality of concurrently transmitted signal groups, and a transformed version of said computed matrix; and
said one or more circuits are operable to generate each of said generated plurality of concurrently transmitted signal groups based on a sequence of data symbols or a sequence of codewords, wherein a statistically computed value for each of said sequence of data symbols is proportional to a computed weighted average value of said transmitted plurality of concurrently transmitted signal groups.

33. The system according to claim 32, wherein said computed weighted average value is computed based on said computed matrix.

34. A system for processing signals in a communication system, the system comprising:
one or more circuits that are operable to generate, over a time window, a plurality of concurrently transmitted signal groups based on a computed matrix, wherein said computed matrix is computed based on at least one rotation angle;
said one or more circuits are operable to transmit said plurality of concurrently transmitted signal groups, wherein said plurality of concurrently transmitted signal groups enable a receiver to generate at least one set of orthogonal signals by multiplying received signals, said received signals based on said plurality of concurrently transmitted signal groups, and a transformed version of said computed matrix; and said one or more circuits are operable to generate each of said generated plurality of concurrently transmitted signal groups based on a sequence of data symbols or a sequence of codewords, wherein a statistically computed value for each of said sequence of codewords is proportional to a computed weighted average value of said transmitted plurality of concurrently transmitted signal groups.

35. The system according to claim 34, wherein said computed weighted average value is computed based on said computed matrix.

* * * * *